(12) United States Patent
Masui et al.

(10) Patent No.: US 10,974,660 B2
(45) Date of Patent: Apr. 13, 2021

(54) CAMERA MODULE

(71) Applicant: DENSO CORPORATION, Kariya (JP)

(72) Inventors: Soji Masui, Kariya (JP); Yoichi Kajino, Kariya (JP); Naoyuki Kurake, Kariya (JP); Yoshihide Itou, Kariya (JP); Sho Okuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/507,439

(22) Filed: Jul. 10, 2019

(65) Prior Publication Data
US 2020/0017037 A1    Jan. 16, 2020

(30) Foreign Application Priority Data
Jul. 12, 2018    (JP) .................................. 2018-132561

(51) Int. Cl.
*B60R 11/04*    (2006.01)
*H04N 5/225*    (2006.01)
*B60R 11/00*    (2006.01)

(52) U.S. Cl.
CPC ........... *B60R 11/04* (2013.01); *H04N 5/2252* (2013.01); *H04N 5/2253* (2013.01); *H04N 5/2254* (2013.01); *H04N 5/2257* (2013.01); *B60R 2011/0026* (2013.01)

(58) Field of Classification Search
USPC ....................................................... 348/148
See application file for complete search history.

(56) References Cited

U.S. PATENT DOCUMENTS

| | | | |
|---|---|---|---|
| 2005/0122419 A1* | 6/2005 | Yoon .................... | H04N 5/2252 348/360 |
| 2012/0075471 A1* | 3/2012 | Seger ..................... | B60R 11/04 348/148 |
| 2012/0207461 A1 | 8/2012 | Okuda | |
| 2015/0015713 A1* | 1/2015 | Wang ....................... | H04N 7/18 348/148 |
| 2015/0268940 A1 | 9/2015 | Baghsorkhi et al. | |
| 2017/0064165 A1* | 3/2017 | Onishi ................... | B60R 11/04 |
| 2017/0257536 A1 | 9/2017 | Takama et al. | |
| 2017/0290170 A1* | 10/2017 | Low ........................ | H05K 1/028 |

FOREIGN PATENT DOCUMENTS

| | | |
|---|---|---|
| JP | 2012166615 A | 9/2012 |
| JP | 2017158098 A | 9/2017 |
| WO | 2013123161 A1 | 8/2013 |

* cited by examiner

*Primary Examiner* — Behrooz M Senfi
(74) *Attorney, Agent, or Firm* — Maschoff Brennan

(57) ABSTRACT

A camera module is mountable to an inner side of a front windshield of a vehicle and is configured to capture an image of an external environment of the vehicle. The camera module includes an optical assembly, a camera casing, and an adhesive. The optical assembly includes an assembly reference surface for determining the position of an optical axis and captures an image of the external environment by forming an optical image incident along the optical axis from the external environment. The camera casing includes a casing reference surface to be positioned with respect to the front windshield on the outside of the camera casing and accommodates the optical assembly in a state separate from inner wall surfaces. The adhesive joins the optical assembly to the camera casing in a state in which the assembly reference surface is aligned with an imaginary plane extending along the casing reference surface.

21 Claims, 16 Drawing Sheets

CAMERA MODULE

CROSS-REFERENCE TO RELATED APPLICATION

This application is based on and claims the benefit of priority from earlier Japanese Patent Application No. 2018-132561 filed Jul. 12, 2018, the description of which is incorporated herein by reference.

BACKGROUND

Technical Field

The present disclosure relates to a camera module.

Related Art

Conventionally, camera modules mounted on the inner side of a windshield of a vehicle and configured to capture images of the external environment of the vehicle have been proposed.

DESCRIPTION OF SPECIFIC EMBODIMENTS

Figure 1:
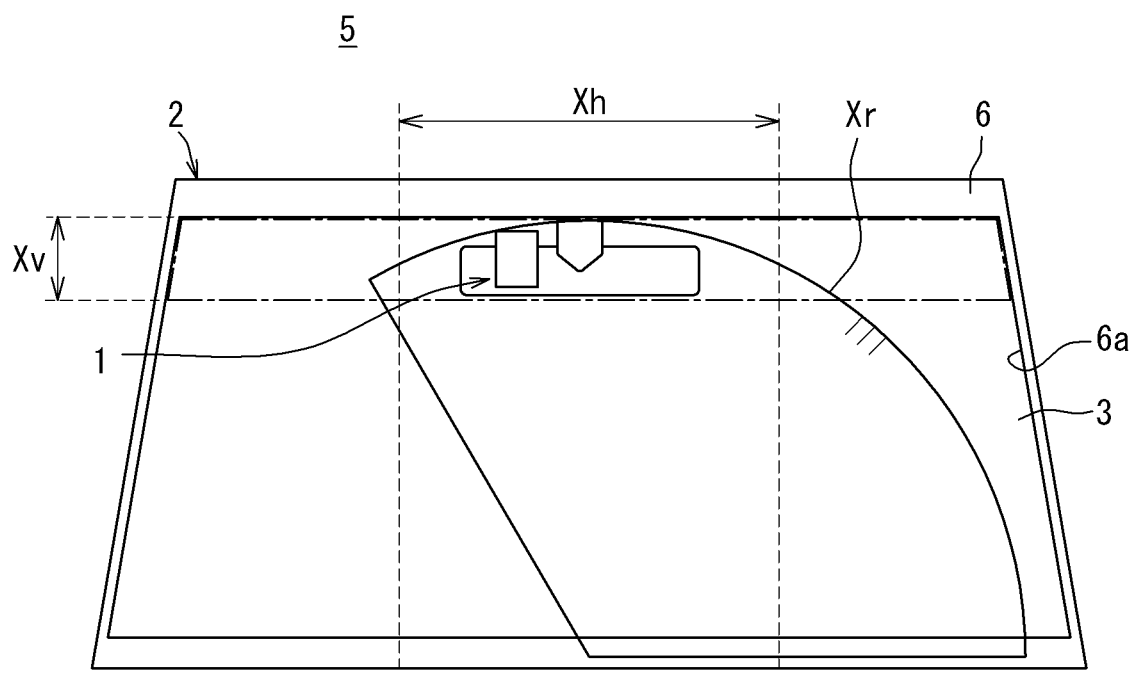
FIG. 1 is a front view of a vehicle to which a camera module according to a first embodiment is applied.

According to a kind of camera module disclosed in JP-A-2017-158098 mentioned above, an optical assembly formed by combining a lens and an imager captures an image of the external environment by forming an optical image incident along an optical axis from the external environment. The optical assembly is in surface contact with and screwed to a camera casing, so that the position is determined. The camera casing accommodates the optical assembly and is mounted on a windshield.

However, to improve the image forming accuracy of the optical image and thus the imaging accuracy of the external environment in the camera module disclosed in JP-A-2017-158098, the contact surfaces of the optical assembly and the camera casing are required to have high surface accuracy as the sections that determine the position of the optical axis. In other words, if the surface accuracy of the contact surfaces of the optical assembly and the camera casing is not high, the imaging accuracy of the external environment is undesirably decreased.

In view of the above, it is desired to have a camera module having a new structure for taking an image of an external environment with high accuracy.

Hereinafter, embodiments will be described with reference to the drawings. Like reference numerals are given to corresponding components among the embodiments, and redundant descriptions may be omitted. In each of the embodiments, when only a part of the structure is described, the structures of other embodiments that have been previously described are applied to the other parts of the structure. Furthermore, besides the combinations of the structures explicitly described in each of the embodiments, the structures of different embodiments may be partially combined with each other even if not specifically mentioned as long as the combination does not cause any problem in particular.

Hereinafter, embodiments of the present disclosure will be described with reference to the drawings. Like reference numerals are given to corresponding components among the embodiments, and redundant descriptions may be omitted. In each of the embodiments, when only a part of the structure is described, the structures of other embodiments that have been previously described are applied to the other parts of the structure. Furthermore, besides the combinations of the structures explicitly described in each of the embodiments, the structures of different embodiments may be partially combined with each other even if not specifically mentioned as long as the combination does not cause any problem in particular.

First Embodiment

Figure 2:
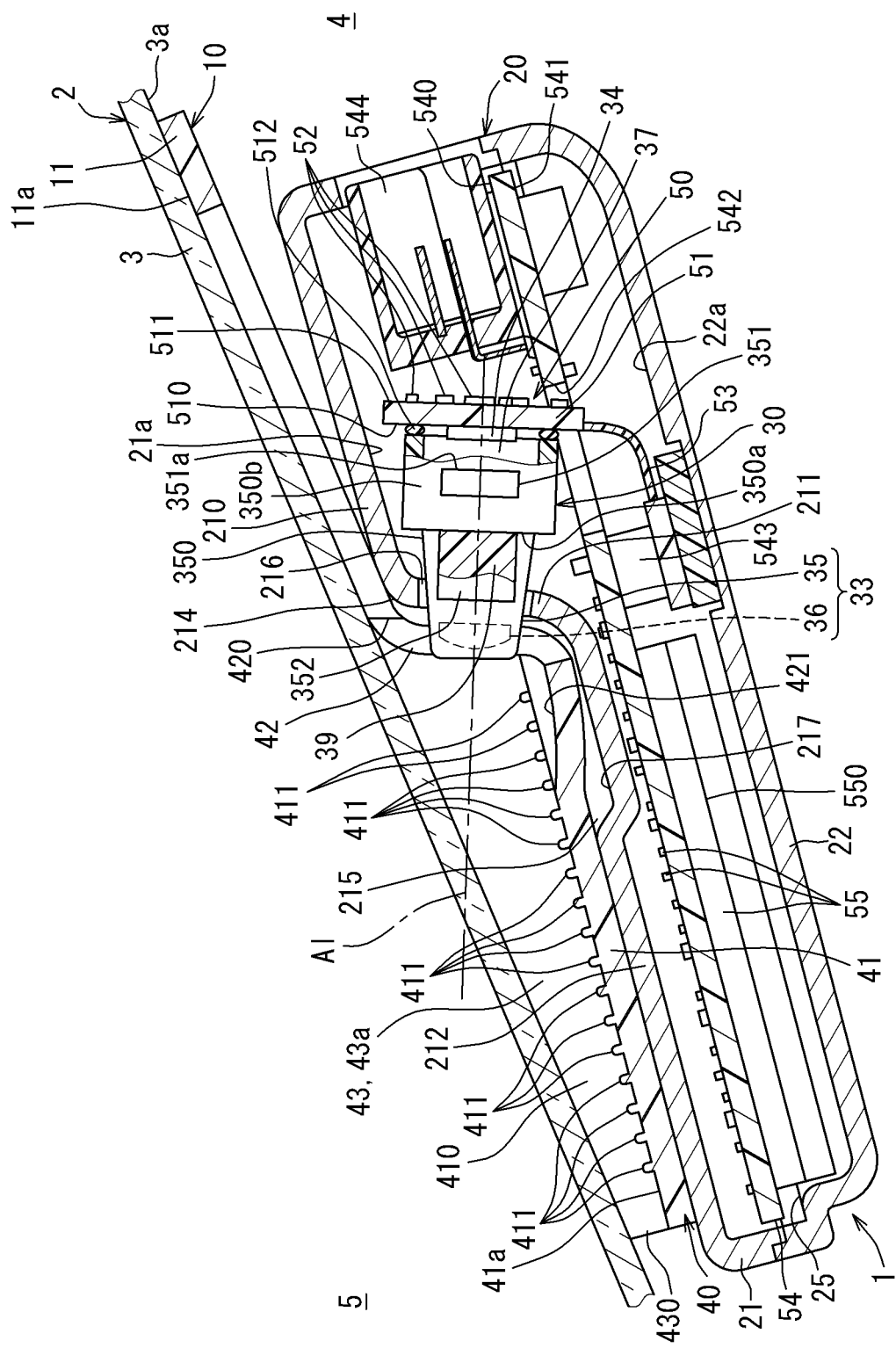
FIG. 2 is a longitudinal cross-sectional view of the camera module according to the first embodiment.

As shown in FIGS. 1 and 2, a camera module 1 according to a first embodiment is mounted on a vehicle 2 and is configured to capture images of an external environment 5. In the following description, the vertical direction of the vehicle 2 on a horizontal plane is set as the up-and-down direction, and the longitudinal direction and the widthwise direction among the horizontal directions of the vehicle 2 on the horizontal plane are set as the front-and-rear direction and the left-and-right direction, respectively.

The camera module 1 is mounted on the inner side of a front windshield 3 of the vehicle 2. The front windshield 3 is located in front of a driver's seat in the vehicle 2. The front windshield 3 partitions the inner side of the windshield 3, which is the inside of a vehicle compartment 4, from the external environment 5. The front windshield 3 is formed of, for example, transparent material such as glass, so that an incident optical image from the scenery of the external environment 5 passes through the front windshield 3 into the vehicle compartment 4.

The mounting position of the camera module 1 on the front windshield 3 is set to a position where the view of an occupant seated in the driver's seat in the vehicle compartment 4 is not substantially hindered. More specifically, as shown in FIG. 1, the mounting position in the up-and-down direction is set within, for example, a range Xv of approximately 20% from the upper edge of an opening 6a of a pillar 6 of the vehicle 2. The pillar 6 retains the peripheral edge of the front windshield 3 in a frame-like manner. The mounting position in the left-and-light direction is set within, for example, a range Xh of approximately 15 cm from the middle of the opening 6a toward both sides. With these settings, the mounting position is located within a wiping range Xr of wipers, which wipe the front windshield 3, and on a section where the front windshield 3 is inclined by, for example, approximately 22 to 90° with respect to the front-and-rear direction.

Figure 3:
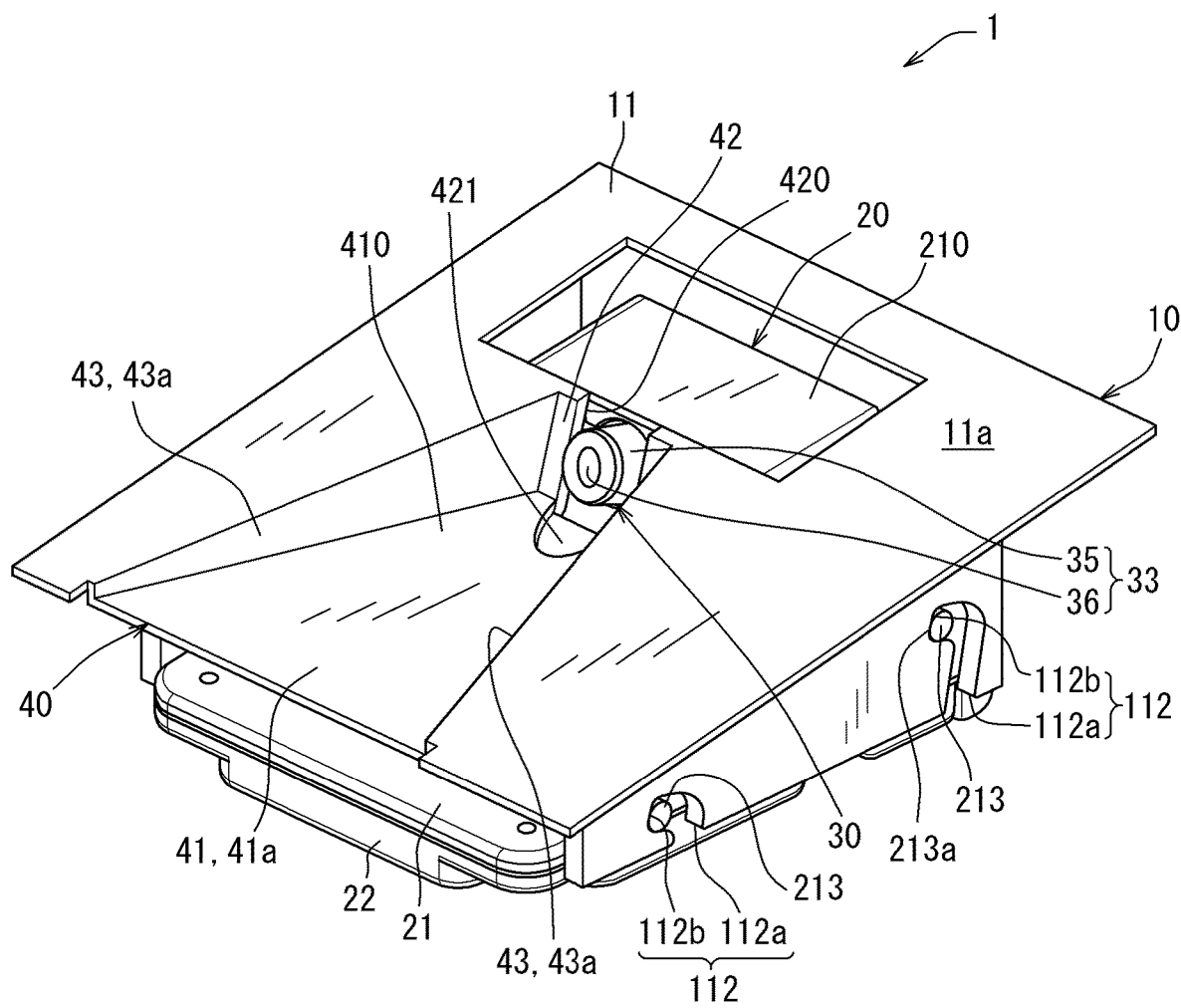
FIG. 3 is a top perspective view of the camera module according to the first embodiment.
Figure 4:
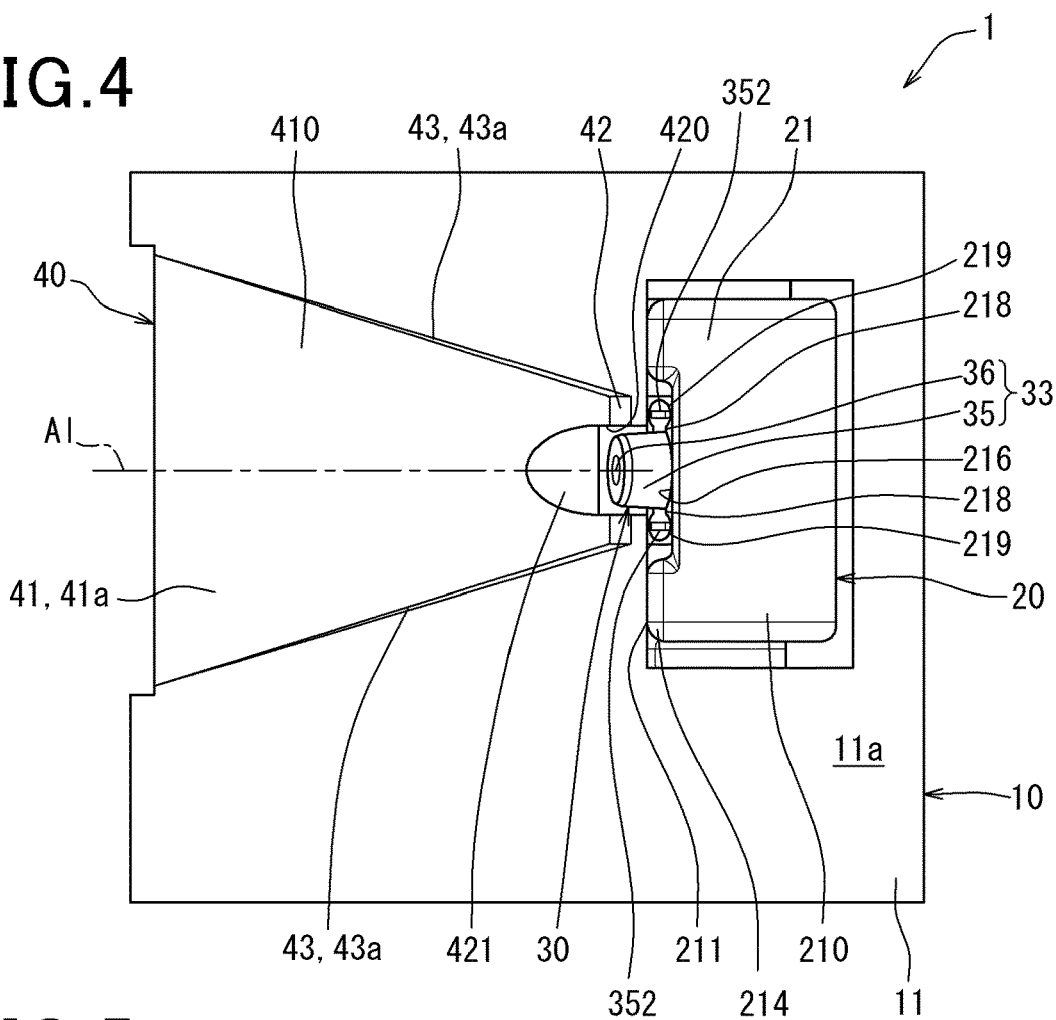
FIG. 4 is a plan view of the camera module according to the first embodiment.

As shown in FIGS. 2 to 4, the camera module 1 includes a bracket assembly 10, a camera casing 20, an optical assembly 30, a hood 40, and a circuit unit 50.

The bracket assembly 10 mainly includes a bracket main body 11. The bracket main body 11 is formed of, for example, hard material that is relatively easily molded such as plastic and shaped generally like a plate. The bracket main body 11 is located along an inner surface 3a of the front windshield 3. A planar upper surface 11a of the bracket main body 11 is securely adhered to the inner surface 3a of the front windshield 3. Thus, the bracket assembly 10 is mounted on the front windshield 3 of the vehicle 2 in an undetachable manner.

As shown in FIGS. 2 to 5, the camera casing 20 is formed by combining a pair of casing members 21 and 22. The casing members 21 and 22 are formed of, for example, hard material having a relatively high heat-dissipation efficiency such as aluminum generally into a hollow shape.

Figure 5:
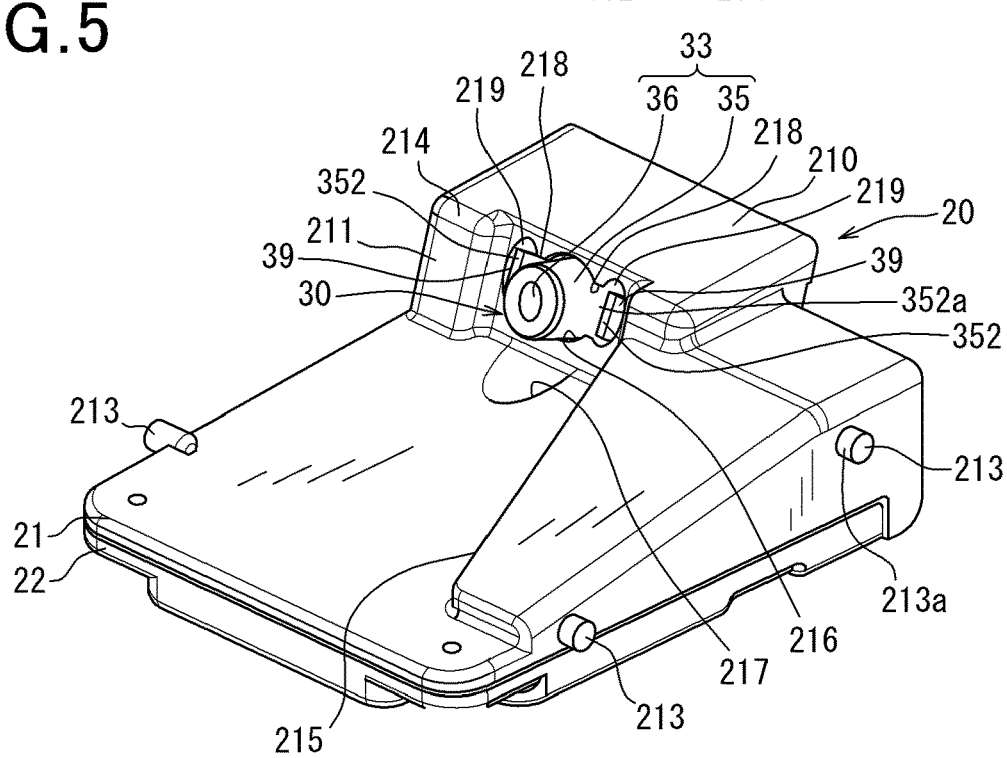
FIG. 5 is a top perspective view of a camera casing and an optical assembly according to the first embodiment.
Figure 9:
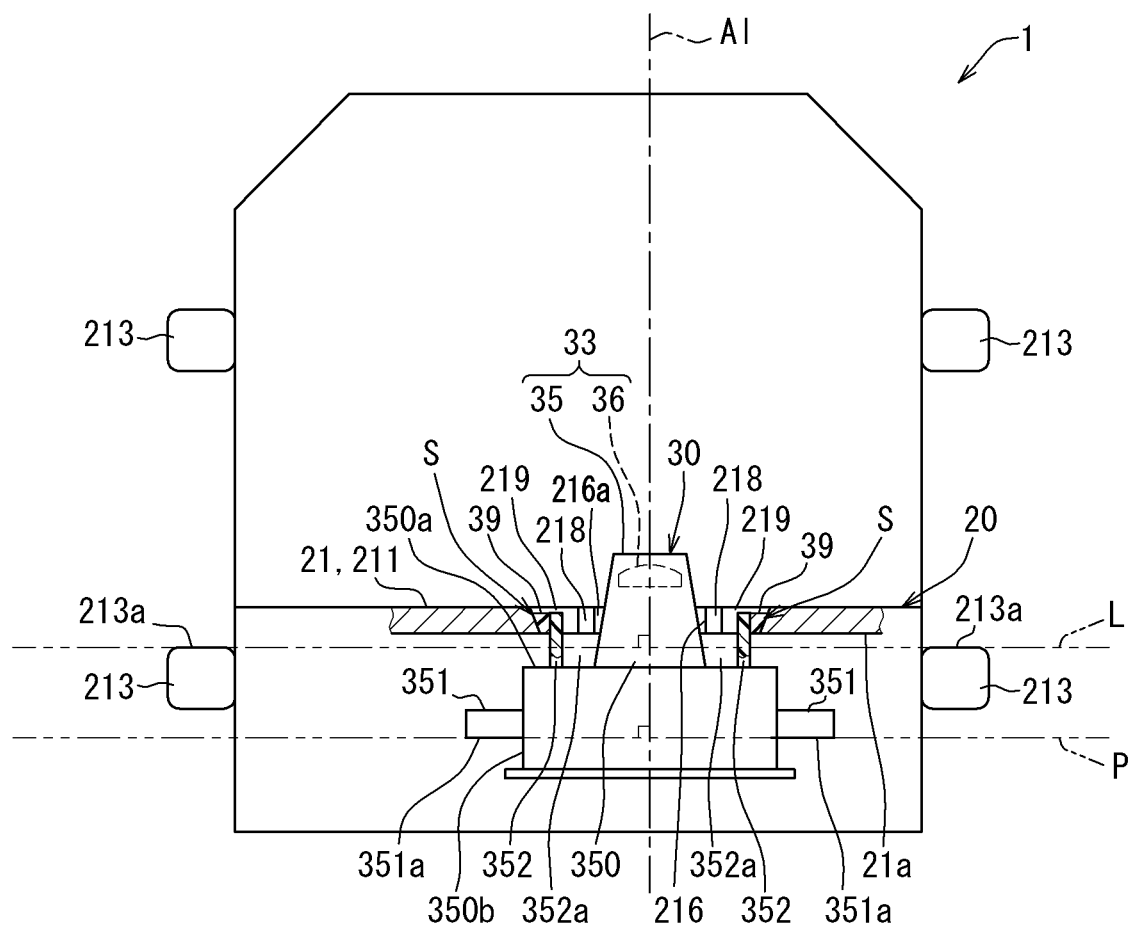
FIG. 9 is a partial cross-sectional schematic diagram illustrating the camera casing and the optical assembly according to the first embodiment.

An inverted cup-shaped upper casing member 21 is located below the bracket assembly 10, so that the opening of the upper casing member 21 faces downward away from the assembly 10. As shown in FIGS. 3, 5, and 9, the upper casing member 21 includes fitting projections 213, which project outwardly sideways. Two of the fitting projections 213 are located on each side edge of the upper casing member 21 to be one in front of the other. In particular, two of the fitting projections 213 that are located to the rear each include a cylindrical outer circumferential surface extending straight in the left or right direction. The cylindrical outer circumferential surfaces form casing reference surfaces 213a.

As shown in FIG. 3, the bracket main body 11 includes fitting grooves 112 individually corresponding to the fitting projections 213, which are located two at the front and two at the rear. Each fitting groove 112 is substantially L-shaped and includes a groove leading end 112a, which is open, and a groove trailing end 112b, which is closed. The groove trailing end 112b of each fitting groove 112 is engaged with the corresponding fitting projection 213 by slide fitting. Thus, in the vehicle 2, the position of the camera casing 20 is determined in a state in which the camera casing 20 is detachably hanging with respect to the bracket assembly 10, and the position of the camera casing 20 is determined with respect to the front windshield 3 at contact sections between the groove trailing ends 112b and the two casing reference surfaces 213a at the rear. The contact section between each casing reference surface 213a and the associated groove trailing end 112b is formed straight along a common imaginary plane P shown in FIG. 9, and in the present embodiment in particular, on an imaginary straight line L, which is parallel to the common imaginary plane P and extends straight to the left and right.

As shown in FIGS. 2 to 5, the upper wall of the upper casing member 21 includes an opposing wall portion 210, a curved wall portion 211, and a recessed wall portion 212. The opposing wall portion 210 is located in a position facing the inner surface 3a of the front windshield 3 with the bracket assembly 10 located in between. The opposing wall portion 210 is maintained as close as possible to the front windshield 3 in this position.

As shown in FIGS. 2 and 5, the curved wall portion 211 curves downward with respect to the opposing wall portion 210. A substantially mountain-shaped ridge section 214, which is formed between the curved wall portion 211 and the opposing wall portion 210, extends along substantially the entire width of the upper casing member 21 and is located as close as possible to the front windshield 3.

The recessed wall portion 212 is curved with respect to the curved wall portion 211. The recessed wall portion 212 is located in a position such that the further the recessed wall portion 212 becomes from the curved wall portion 211 toward the front side, the closer the recessed wall portion 212 becomes to the front windshield 3 located above. The recessed wall portion 212 in this position defines an accommodation recess 215, which accommodates the hood 40, between the recessed wall portion 212 and the front windshield 3.

A dish-like lower casing member 22 is located below the upper casing member 21, so that the opening of the lower casing member 22 faces upward toward the upper casing member 21. The lower casing member 22 is fastened to the upper casing member 21 with screws. Thus, the casing members 21 and 22 cooperate to define an accommodation space 25, which accommodates the optical assembly 30 and the circuit unit 50.

As shown in FIGS. 2 to 7, the optical assembly 30 is formed by combining a lens unit 33 and an imager 34. The lens unit 33 includes a lens holder 35 and an imaging lens 36.

The lens holder 35 is formed of, for example, hard material that is relatively easily molded such as plastic into a hollow shape. As shown in FIGS. 2, 5, and 9, the lens holder 35 is joined to the upper casing member 21 of the camera casing 20 with adhesives 39. Thus, the optical assembly 30 including the lens holder 35 is accommodated in the camera casing 20 in a state separate from inner wall surfaces 21a and 22a of the casing members 21 and 22.

As shown in FIG. 2, the lens holder 35 defines an optical path space 37, which introduces an optical image through the accommodated imaging lens 36. The front end portion of the lens holder 35 is exposed to the outside of the camera casing 20 through the curved wall portion 211. For the exposure, the curved wall portion 211 includes a lens window 216 as shown in FIGS. 2 and 5. The lens window 216 is a through-hole that extends through the wall surfaces at the laterally middle portion for the lens holder 35 to be inserted. The recessed wall portion 212 includes an escape hole 217, which opens in the upper wall surface at the laterally middle portion.

The imaging lens 36 shown in FIGS. 2 to 7 is formed of, for example, transparent material such as glass. The imaging lens 36 is formed into a lens shape corresponding to an intended lens angle of view, such as a concave meniscus lens at, for example, a wide lens angle of view of approximately 75 to 150°. The imaging lens 36 is accommodated in the lens holder 35 together with a rear lens set (not shown) for correcting optical aberrations such as chromatic aberrations. The imaging lens 36 is securely fitted to the front end portion of the lens holder 35, so that the optical path space 37 is closed from the front side. The optical axis Al that passes through the principal point of the imaging lens 36 in the lens unit 33 is set to be inclined downward or upward toward the front with respect to the front-and-rear direction, or is set along the front-and-rear direction. The imaginary plane P in FIG. 9 is assumed to extend along the contact sections between the casing reference surfaces 213a and the groove trailing ends 112b, and in the present embodiment in particular, to extend substantially parallel to the contact sections so as to be substantially orthogonal to the optical axis Al.

The imager 34 shown in FIG. 2 mainly includes, for example, a color or monochrome image sensor such as CCD or CMOS. The imager 34 may be such an image sensor combined with, for example, an infrared-cut filter (not shown) or such devices located in front of the image sensor. The imager 34 is generally shaped like a rectangular plate. When the imager 34 is accommodated in the lens holder 35, the imager 34 is located in the optical path space 37.

With the configuration of the optical assembly 30 described above, the optical image that passed through the front windshield 3 from the external environment 5 is formed on the imager 34 through the lens unit 33 including the imaging lens 36. At this time, an optical image from the imaging range of the external environment 5 is formed on the imager 34 as an inverted image. The imager 34 is configured to be able to output signals or data generated by taking an image of the external environment 5 by capturing the inverted image that is formed on the imager 34.

As shown in FIGS. 2 to 4, the hood 40 is formed integrally with the bracket main body 11 by, for example, plastic molding so as to constitute part of the bracket assembly 10. The general shape of the hood 40 as viewed from the top is like a dish symmetrical with respect to the optical axis Al of the optical assembly 30 including the imaging lens 36. The hood 40 includes a base wall portion 41, a rear end wall portion 42, and side wall portions 43.

As shown in FIG. 2, the base wall portion 41 is located above the recessed wall portion 212, below the optical axis Al, and in front of the curved wall portion 211. The base wall portion 41 is accommodated in the accommodation recess 215 between the recessed wall portion 212 and the front windshield 3. The base wall portion 41 is located in a position so that the further the base wall portion 41 becomes from the curved wall portion 211 toward the front, the closer the base wall portion 41 becomes to the front windshield 3 located above. Thus, a bottom wall surface 41a, which faces upward of the base wall portion 41, faces the inner surface 3a of the front windshield 3 with an imaging space 410 formed in between in a state in which the bottom wall surface 41a widens into a substantially trapezoidal plane. The optical image of the external environment 5 within the imaging range of the imager 34 passes through the front windshield 3 to be introduced to the imaging space 410.

As shown in FIGS. 2 to 4, the base wall portion 41 includes restriction ribs 411. The restriction ribs 411 project from the bottom wall surface 41a of the base wall portion 41 toward the inside of the imaging space 410 located above, that is, toward the front windshield 3. The restriction ribs 411 are projections extending straight and are arranged substantially in the left-and-right direction. The restriction ribs 411 are arranged with predetermined intervals between one another so that one is in front of the other. The restriction ribs 411 trap the incident light between one another by multiple reflections of the light incident to the base wall portion 41 on the opposing wall surfaces of the restriction ribs 411. The projection heights of the restriction ribs 411 are set to predetermined values so as to achieve the trapping function. In FIGS. 3 and 4, illustration of the restriction ribs 411 is omitted.

The laterally middle portion of the rear end wall portion 42 is substantially aligned with the optical axis Al. The rear end wall portion 42 stands upright from the rear edge of the base wall portion 41. The rear end wall portion 42 extends substantially parallel to the curved wall portion 211, which is substantially perpendicular to the optical axis Al. The rear end wall portion 42 includes a lens window 420, which is a through-hole extending between the wall surfaces at the laterally middle portion of the rear end wall portion 42 for the lens holder 35 to be inserted. The front end portion of the lens holder 35, in which the imaging lens 36 is located, is exposed to the inside of the imaging space 410 above the base wall portion 41 through the above-described lens window 216 and the lens window 420. The optical axis Al is aimed to the imaging space 410, which is a predetermined region to be imaged. Thus, the optical image introduced to the imaging space 410 from within the imaging range of the external environment 5 is allowed to enter the lens unit 33 including the imaging lens 36 on the optical axis Al.

The base wall portion 41 includes an incident hole 421, which opens in the bottom wall surface 41a at the laterally middle portion in the vicinity of the exposed lens holder 35. The incident hole 421 communicates with the escape hole 217, which is formed in the recessed wall portion 212 located below. Thus, the incident hole 421 has a depth that allows the optical image from the entire imaging range of the external environment 5 to enter the lens unit 33.

The side wall portions 43 are located at symmetrical positions on both left and right sides of the optical axis Al, so that the side wall portions 43 are located across the imaging space 410 from each other. The side wall portions 43 stand upright from the left and right side edges of the base wall portion 41. The side wall portions 43 are formed to be substantially perpendicular to the bottom wall surface 41a of the base wall portion 41 and are located substantially along the up-and-down direction. Each side wall portion 43 includes an inner wall surface 43a, which is shaped like a trapezoidal plane.

The distance between the left and right inner wall surfaces 43a gradually increases toward the front. The height of each side wall portion 43 from the base wall portion 41 gradually decreases toward the front. Thus, the side wall portions 43 are located in a position to form a gap 430 as shown in FIG. 2 along the entire length in the front-and-rear direction with respect to the inner surface 3a of the front windshield 3.

The hood 40 configured as described above is capable of restricting the entrance of the excess light to the lens unit 33 from the imaging range of the external environment 5, for example, the entrance of the reflected light from the inner surface 3a of the front windshield 3. Additionally, the hood 40 is capable of restricting light reflection from the base wall portion 41 to the lens unit 33 by the light trap function of the restriction ribs 411.

Figure 6:
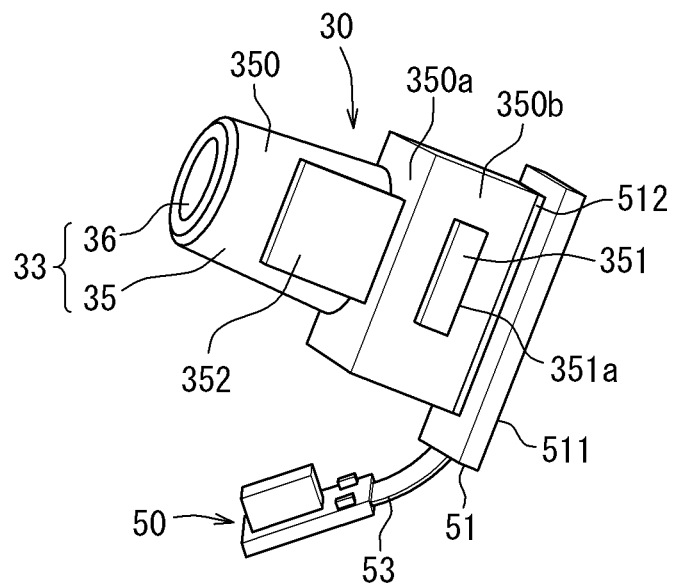
FIG. 6 is a side perspective view of the optical assembly and a circuit unit according to the first embodiment.
Figure 7:
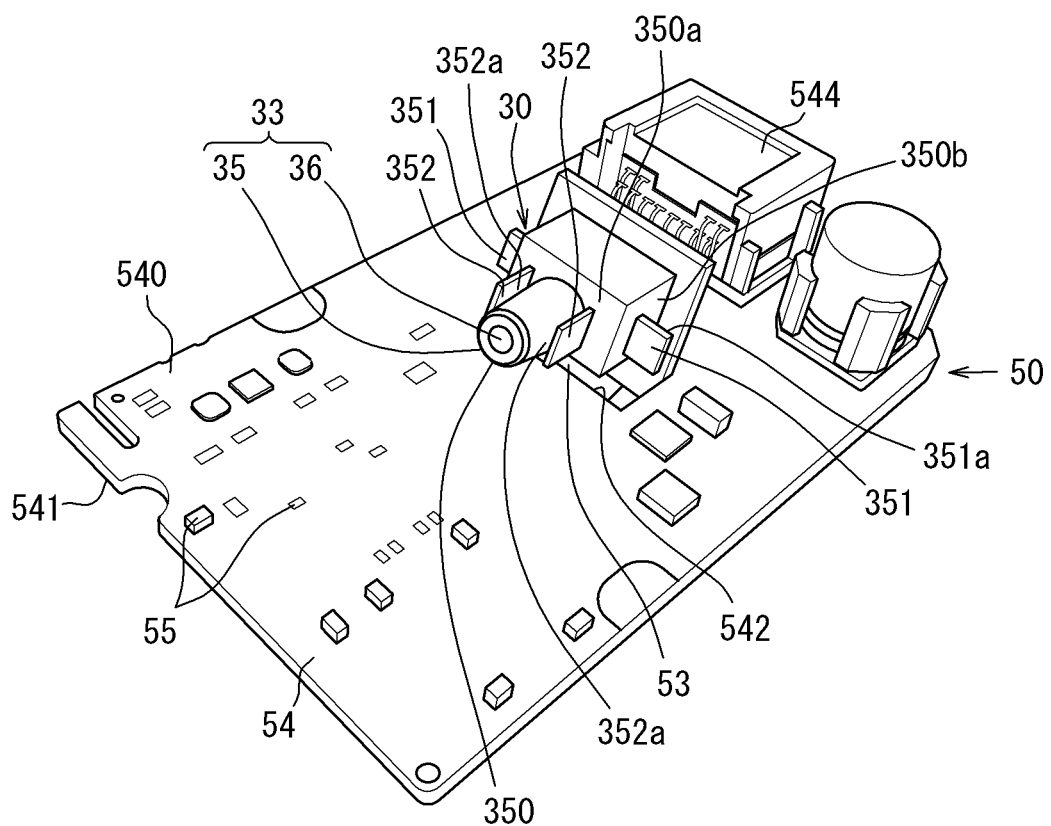
FIG. 7 is a top perspective view of the optical assembly and the circuit unit according to the first embodiment.

As shown in FIGS. 2, 6, and 7, the accommodation position of the circuit unit 50 in the accommodation space 25 is determined together with the lens unit 33 and the imager 34 of the optical assembly 30. The circuit unit 50 is formed by combining substrates 51, 53, and 54 and circuits 52 and 55.

As shown in FIGS. 2 and 6, an imaging substrate 51 is, for example, a rigid substrate such as a glass epoxy substrate and is shaped like a substantially rectangular plate. The imaging substrate 51 is joined to the rear end portion of the lens holder 35 in the optical assembly 30 with an adhesive 512. Thus, the imaging substrate 51 closes the optical path space 37 from the rear side. The imaging substrate 51 includes a front mounting surface 510, which is exposed in the optical path space 37, and a rear mounting surface 511, which is exposed in the accommodation space 25 on the reverse side from the front mounting surface 510. The imager 34 is mounted on the front mounting surface 510. Circuit elements configuring an imaging circuit 52 are mounted on the mounting surfaces 510 and 511. Accordingly, the imaging circuit 52 is capable of transmitting and receiving signals or data to and from the imager 34.

As shown in FIGS. 2, 6, and 7, a flexible substrate (FPC) 53 includes, for example, a base film made of, for example, flexible plastic with conductive wires retained on the base film. The flexible substrate 53 is generally shaped like a substantially rectangular band. One end of the FPC 53 is connected to the lower end of the imaging substrate 51.

As shown in FIGS. 2 and 7, a control substrate 54 is, for example, a rigid substrate such as a glass epoxy substrate and is shaped like a substantially rectangular plate. The surfaces of the control substrate 54 face upward and downward in the accommodation space 25. Thus, the control substrate 54 includes an upper mounting surface 540, which faces upward, and a lower mounting surface 541, which faces downward. The peripheral edge of the control substrate 54 and portions on the upper mounting surface 540 abut against the upper casing member 21, and portions on the lower mounting surface 541 abut against the lower casing member 22. This determines the position of the control substrate 54 between the casing members 21 and 22. The control substrate 54 includes a connection hole 542, which is a substantially rectangular hole extending through the mounting surfaces 540 and 541 at the laterally middle portion of the control substrate 54 for the imaging substrate 51 and the lens holder 35 to be inserted. Thus, the imaging substrate 51 and the lens holder 35 are located across the upper side and the lower side of the control substrate 54.

Circuit elements configuring a control circuit 55 are mounted on the mounting surfaces 540 and 541. An external connector 544, which is exposed to the outside of the camera casing 20, is mounted on the upper mounting surface 540. The external connector 544 is connected to, for example, an external circuit such as an ECU outside the camera casing 20. As shown in FIG. 2, an internal connector 543, which is exposed to the inside of the accommodation space 25, is mounted on the lower mounting surface 541. The internal connector 543 is connected to the other end of the FPC 53 located below the control substrate 54. Thus, the control substrate 54 is connected to the imaging substrate 51 through the FPC 53, and signals or data can be transmitted and received between the control circuit 55 and the imaging circuit 52.

Figure 8:
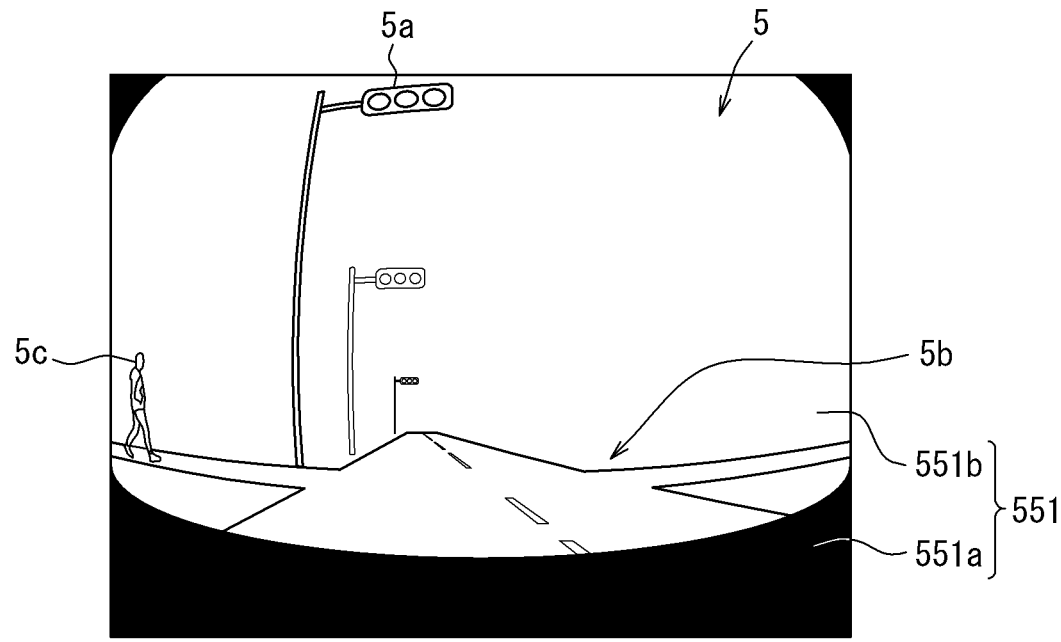
FIG. 8 is a front schematic diagram illustrating an external environment image generated by the first embodiment.

The control circuit 55 includes a microcomputer 550, which mainly includes a processor, as a circuit element mounted on the lower mounting surface 541. The control circuit 55 cooperates with the imaging circuit 52 to perform the image processing of the output from the imager 34 and generates an external environment image 551 as shown in FIG. 8. At this time, the external environment image 551 is generated so that structures and obstacles in the imaging range of the external environment 5 displayed on the image 551 are recognizable. As exemplified in FIG. 8, if the vehicle 2 approaches a traffic light 5a, which may be a structure located above the roof panel, the imaging range is set so that the traffic light 5a is recognizably displayed on the external environment image 551. Furthermore, as exemplified in FIG. 8, if the front bumper of the vehicle 2 approaches an intersection 5b, the imaging range is set so that a front obstacle 5c (such as a pedestrian, a bike, and other vehicles) entering the intersection 5b from the left or right is recognizably displayed on the external environment image 551.

Furthermore, the control circuit 55 cooperates with the imaging circuit 52 to control the imaging operation of the imager 34 including the exposure state during imaging performed by the imager 34. At this time, as exemplified in FIG. 8, at the lower section of the external environment image 551 generated by the above image processing function, the range of effective pixels 551b is set avoiding the range of vehicle capturing pixels 551a where part of the vehicle 2 (for example, the hood) is displayed. Thus, the exposure state during the next capture is controllable based on the pixel value of the effective pixels 551b in the setting range.

Besides the above-described image processing function and imaging control function, for example, the control circuit 55 may, but does not necessarily have to, include an image recognition function that recognizes structures and obstacles in the imaging range displayed on the external environment image 551. Furthermore, at least one of the image processing function and the imaging control function may be included in only the control circuit 55 or in only the imaging circuit 52.

Detailed Structure

Next, the detailed structure of the camera module 1 will be described.

In the optical assembly 30 shown in FIGS. 2, 4 to 7, and 9 to 11, the lens holder 35 of the lens unit 33 integrally includes a lens barrel 350, positioning sections 351, and joint projections 352. That is, the lens barrel 350, the positioning sections 351, and the joint projections 352 are formed of the same member as the member configuring the lens holder 35.

The lens barrel 350 is a stepped cylinder surrounding the optical path space 37. The lens barrel 350 coaxially retains the imaging lens 36 on the front side and the rear lens set on the rear side in the optical path space 37, so that the lens barrel 350 is substantially aligned with the optical axis Al of the optical assembly 30. The lens barrel 350 includes, as shown in FIGS. 2, 6, 7, and 9 to 11, an annular flat surface 350a, which faces forward at a position outside the optical path space 37. The annular flat surface 350a is substantially parallel to the imaginary plane P extending along the casing reference surfaces 213a.

As shown in FIGS. 2, 6, 7, and 9, the positioning sections 351 are located at symmetrical positions on both left and right sides of the optical axis Al one on each side. The positioning sections 351 are plates that project sideways from side surfaces 350b of the lens barrel 350 located rearward of the flat surface 350a and are substantially perpendicular to the optical axis Al. The rear surfaces of the positioning sections 351 aligned with the imaginary plane P each form an assembly reference surface 351a. The assembly reference surfaces 351a are formed of the same member as the member of the joint projections 352 as the components of the lens holder 35. Thus, in the lens unit 33, which constitutes the optical assembly 30 of the present embodiment, the assembly reference surfaces 351a cooperate to determine the position of the optical axis Al in a position substantially orthogonal to the imaginary plane P of FIG. 9.

As shown in FIGS. 2, 4 to 7, and 9 to 11, the joint projections 352 are located at symmetrical positions on both left and right sides of the optical axis Al one on each side. The joint projections 352 are plates that project forward from the flat surface 350a of the lens barrel 350 located rearward of the positioning sections 351 and are substantially parallel to the optical axis Al. The joint projections 352 form spaces 352a in the vicinity of the lens barrel 350.

As shown in FIGS. 2, 4, 5, and 9 to 11, the curved wall portion 211 of the upper casing member 21 of the camera casing 20 includes the afore-mentioned lens window 216 together with communication windows 218 and exposure windows 219. The lens barrel 350, which enters the lens window 216 with a gap formed in between, projects outside the window 216. Thus, the lens barrel 350 is exposed to the outside of the camera casing 20 through the lens window 216.

As shown in FIGS. 4, 5, and 9 to 11, the communication windows 218 are located at symmetrical positions on both left and right sides of the optical axis Al one on each side. The communication windows 218 extend through the wall surfaces of the curved wall portion 211 of the upper casing member 21 to communicate with the lens window 216. The communication windows 218 are narrower than the lens window 216 in the vertical direction and are open to the inside and the outside of the camera casing 20. The opening of the communication windows 218 in the camera casing 20 faces the corresponding one of the left and right spaces 352a in the front-and-rear direction. Thus, the spaces 352a are exposed to the outside of the camera casing 20 through the communication windows 218. However, the spaces 352a and the communication windows 218 of the present embodiment are covered by the rear end wall portion 42 of the hood 40 from the front.

The exposure windows 219 are located at symmetrical positions on both left and right sides of the optical axis Al one on each side. The exposure windows 219 extend through the wall surfaces of the curved wall portion 211 of the upper casing member 21 to communicate with the lens window 216 through the corresponding one of the left and right communication windows 218. The exposure windows 219 are wider than the communication windows 218, which are located between the lens window 216 and the exposure windows 219, in the vertical direction and are open to the inside and the outside of the camera casing 20. In other words, the communication windows 218 are opened to be narrower in the vertical direction than the exposure windows 219, which are located to the opposite direction from the lens window 216.

Each exposure window 219 accommodates the corresponding one of the left and right joint projections 352. Thus, although the joint projections 352 do not project outside the corresponding one of the exposure windows 219, the joint projections 352 are exposed to the outside of the camera casing 20 through the corresponding exposure window 219. However, the joint projections 352 and the exposure windows 219 of the present embodiment are covered by the rear end wall portion 42 of the hood 40 from the front.

Figure 10:
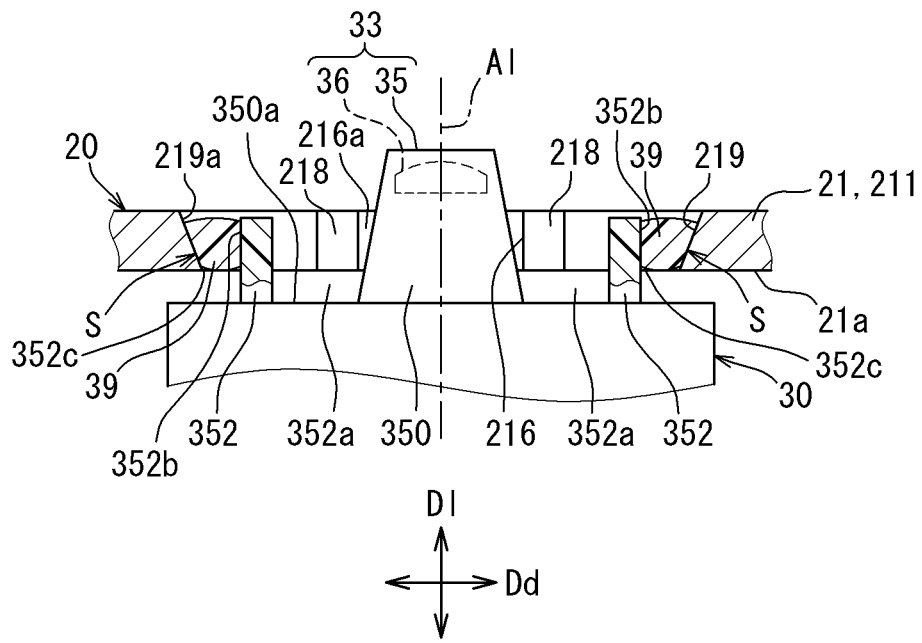
FIG. 10 is a partially enlarged cross-sectional schematic diagram illustrating the camera casing and the optical assembly according to the first embodiment.
Figure 11:
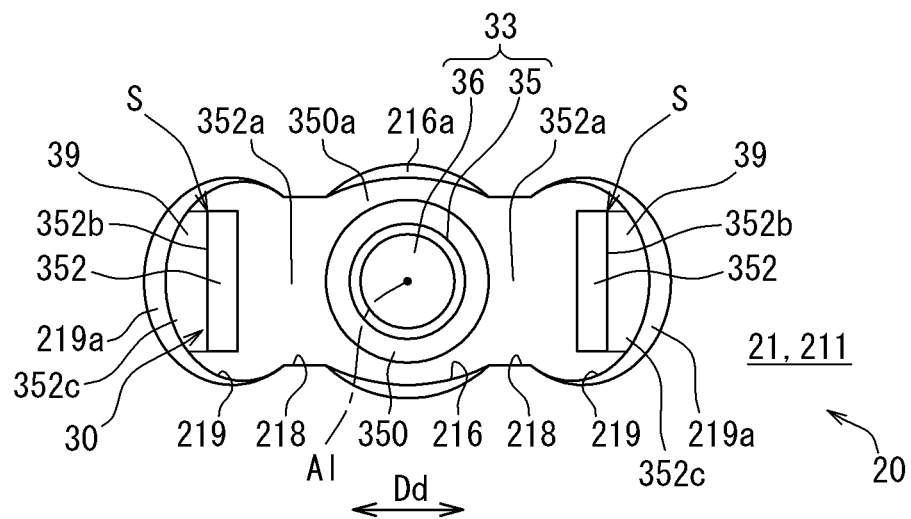
FIG. 11 is a front schematic diagram illustrating the camera casing and the optical assembly according to the first embodiment.

As shown in FIGS. 10 and 11, the exposure windows 219 are each surrounded by an exposure surface 219a, which is formed like a chamfer on the curved wall portion 211. The exposure surfaces 219a of the exposure windows 219 are inclined to separate further from the joint projections 352 toward the front, that is, toward the outside of the camera casing 20. Similarly, the lens window 216 is surrounded by inclined surfaces 216a, which are formed like chamfers on the curved wall portion 211. The inclined surfaces 216a of the lens window 216 are inclined to separate further from the lens barrel 350 toward the front, that is, toward the outside of the camera casing 20. The sections of the curved wall portion 211 surrounding the communication windows 218 are not chamfered in the present embodiment and are substantially parallel to the optical axis Al.

Since the exposure surfaces 219a of the exposure windows 219 do not need to be additionally polished, the exposure surfaces 219a have a lower surface accuracy than the surface accuracy of the casing reference surfaces 213a and the assembly reference surfaces 351a, which require additional polishing. Similarly, since an assembly adhesion surface 352b of each joint projection 352 on the reverse side from the lens barrel 350 does not need to be additionally polished, the assembly adhesion surfaces 352b have a lower surface accuracy than the surface accuracy of the casing reference surfaces 213a and the assembly reference surfaces 351a, which require additional polishing.

A joint gap 352c is formed between the assembly adhesion surface 352b of each joint projection 352 and the corresponding one of the left and right exposure surfaces 219a. Each joint gap 352c is filled with the adhesive 39 shown in FIGS. 9 to 11. The adhesives 39 of the camera module 1 according to the first embodiment are ultraviolet curing adhesives that are curable by exposure to ultraviolet light. The section where each assembly adhesion surface 352b is joined to a casing adhesion surface, which is the associated exposure surface 219a, via the adhesive 39 as described above forms a joint section S. Each joint section S is located on the opposite side of the associated joint projection 352 from the space 352a in a left and right orthogonal direction Dd. The orthogonal direction Dd is one of the intersecting directions that intersect with an optical axis direction Dl in which the optical axis Al extends as shown in FIGS. 10 and 11. Thus, the joint sections S are located at symmetrical positions on the left and right sides of the optical axis Al and are exposed to the outside of the camera casing 20 through the exposure windows 219 surrounded by the exposure surfaces 219a. Furthermore, the joint sections S are located along the optical axis direction Dl as shown in FIG. 10. With the above configuration, at the contact sections S, the size of the joint gaps 352c is determined depending on the thickness of the cured adhesives 39.

Manufacturing of the camera module 1 employing the detailed structure described above is executed as shown in FIGS. 12 to 14 in the first embodiment.

Figure 12:
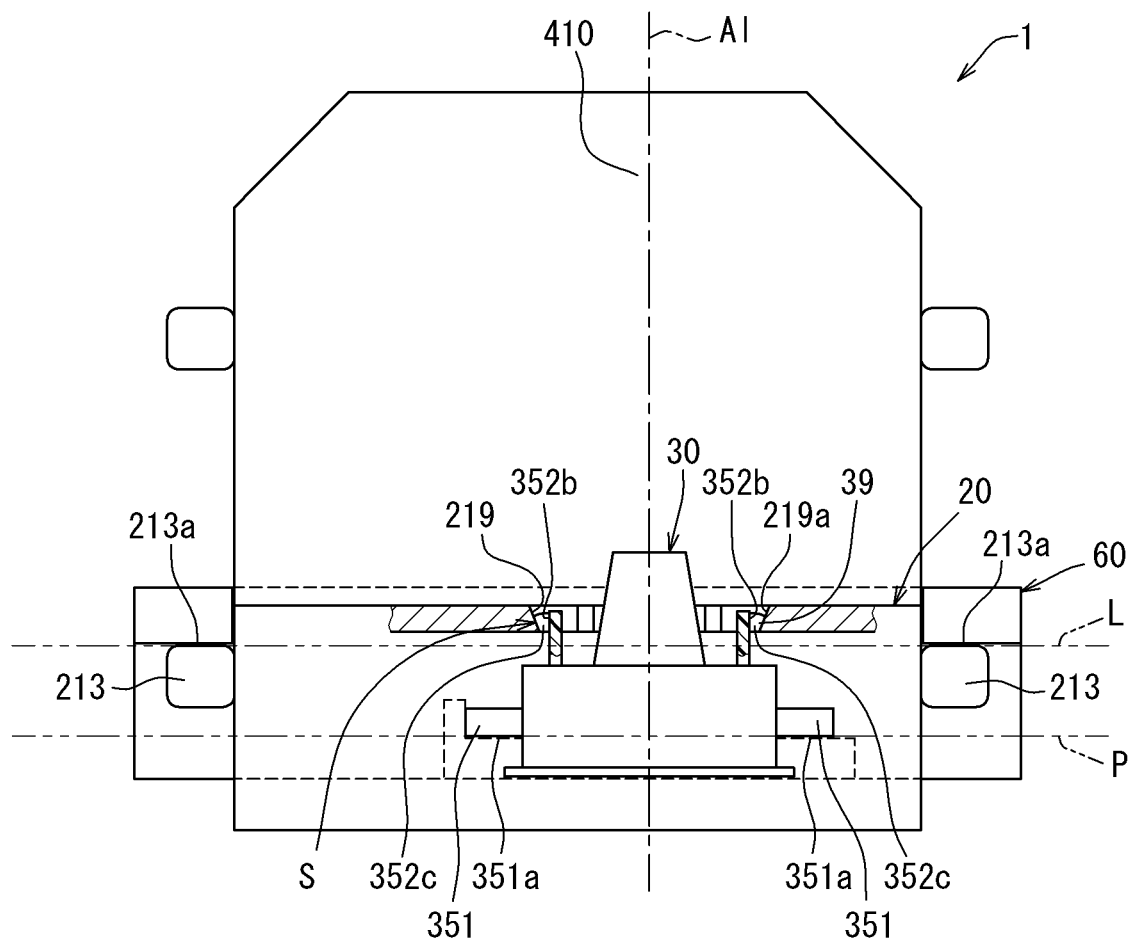
FIG. 12 is a partial cross-sectional schematic diagram illustrating a method for manufacturing the camera module according to the first embodiment.
Figure 13:
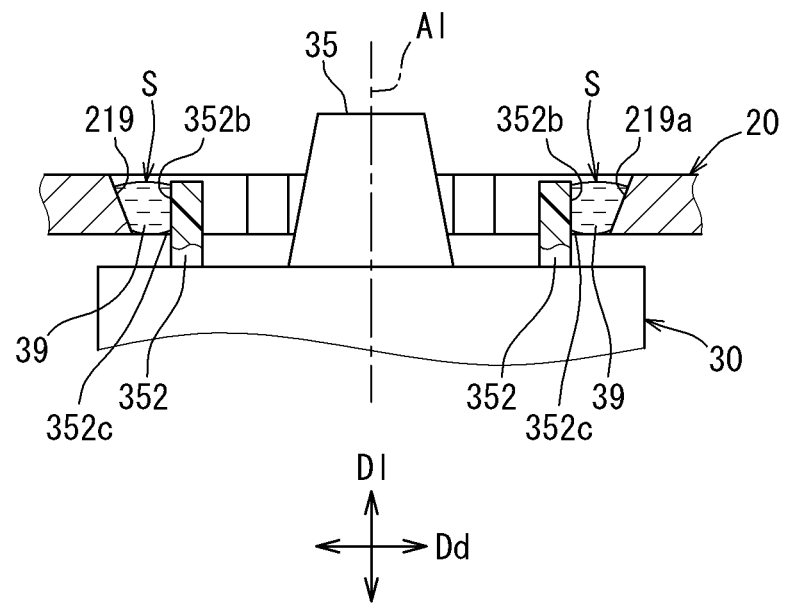
FIG. 13 is a partial cross-sectional schematic diagram illustrating the method for manufacturing the camera module according to the first embodiment.

First, in a placing process shown in FIGS. 12 and 13, the assembly reference surfaces 351a of the positioning sections 351 of the optical assembly 30 are aligned with the imaginary plane P, which extends along the casing reference surfaces 213a of the fitting projections 213 of the camera casing 20, to achieve the aligned state. At this time, the assembly reference surfaces 351a and the casing reference surfaces 213a are secured to a jig 60 as shown in FIG. 12, so that the assembly reference surfaces 351a and the casing reference surfaces 213a are positioned with respect to each other via the jig 60. As a result, the position of the assembly reference surfaces 351a relative to the casing reference surfaces 213a on an imaginary line L is adjusted through 6-axis adjustment so that the optical axis Al of the optical assembly 30, which includes the imaging lens 36, is oriented toward the imaging space 410. Consequently, as the relative position of the reference surfaces 213a and 351a is fitted to a proper position on the imaginary plane P, the joint gaps 352c are formed between the assembly adhesion surfaces 352b of the joint projections 352 of the optical assembly 30 and the exposure surfaces 219a of the exposure windows 219 of the camera casing 20 as shown in FIGS. 12 and 13.

The placing process as above further applies the adhesives 39, which are in the form of a gel or liquid before curing, to at least either of the assembly adhesion surfaces 352b or the exposure surfaces 219a while the securing of the assembly reference surfaces 351a to the jig 60 and the securing of the casing reference surfaces 213a to the jig 60 are sequentially executed. Thus, after the securing of the assembly reference surfaces 351a and the casing reference surfaces 213a are completed, the adhesives 39 are placed along the optical axis direction Dl in the joint gaps 352c between the assembly adhesion surfaces 352b and the exposure surfaces 219a, so that the joint sections S are formed. In regard to the order of securing the assembly reference surfaces 351a and the casing reference surfaces 213a, the assembly reference surfaces 351a may be secured to the jig 60 first, or the casing reference surfaces 213a may be secured to the jig 60 first.

Figure 14:
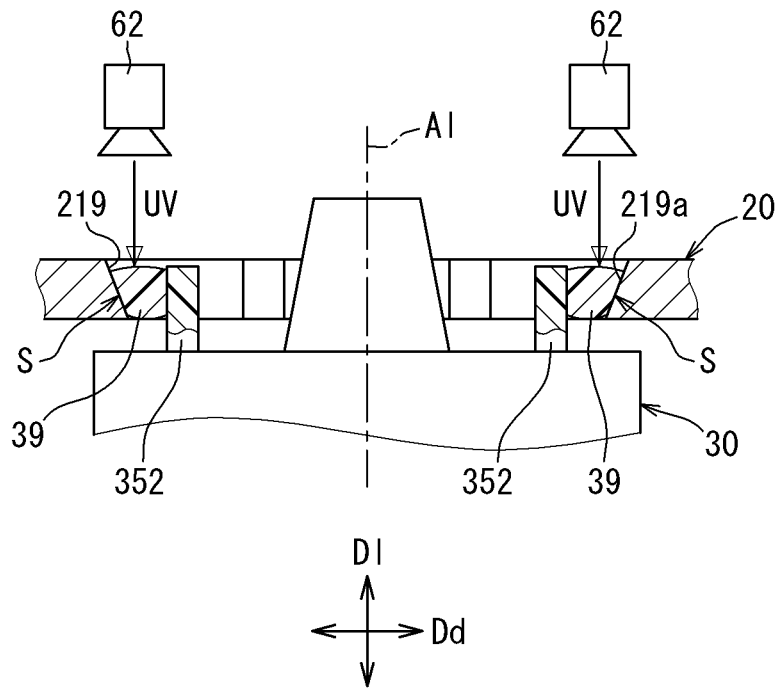
FIG. 14 is a partial cross-sectional schematic diagram illustrating the method for manufacturing the camera module according to the first embodiment.

Subsequently, in a securing process shown in FIG. 14, while the position of the assembly reference surfaces 351a on the imaginary plane P is maintained by the jig 60 (not shown), the adhesives 39 that have been placed are irradiated with ultraviolet light through the exposure window 219 of the camera casing 20, so that the adhesives 39 are cured. At this time, ultraviolet light is emitted from ultraviolet emitters 62 with a wavelength of, for example, 300 to 450 nm. The ultraviolet emitters 62 are set at positions corresponding to the joint sections S, which are located at symmetrical positions on the left and right sides of the optical axis Al of the optical assembly 30. Thus, ultraviolet light is emitted from the ultraviolet emitters 62 along the optical axis direction Dl.

In the curing process as above, at the joint sections S along the optical axis direction Dl, the adhesives 39, which are exposed to the outside of the camera casing 20 through the exposure window 219, are irradiated with ultraviolet light from the ultraviolet emitters 62, respectively. As a result, at the joint sections S between the joint projections 352 and the exposure surfaces 219a, the adhesives 39 are cured by the progress of the photopolymerization reaction. The ultraviolet irradiation process on the joint sections S is continued for the time during which the curing of substantially the entire adhesives 39 is assumed to be completed, so that the position of the optical assembly 30 relative to the camera casing 20 is determined together with the size of the joint gaps 352c. The ultraviolet curing adhesives 39 are, for example, epoxy resin.

In a fastening process following the above, the casing members 21 and 22 are fastened to each other with screws, so that the camera casing 20 accommodates the optical assembly 30 and the circuit unit 50 as shown in FIG. 2. The camera casing 20 configured as described above is mounted on the front windshield 3 via the bracket assembly 10, which is integral with the hood 40. The camera module 1 is used in the vehicle 2 in this state.

Operational Advantages

Hereinafter, the operational advantages of the first embodiment will be described.

In the optical assembly 30 of the first embodiment, the assembly reference surfaces 351a, which determine the position of the optical axis Al, are aligned on the imaginary plane P. The imaginary plane P extends along the casing reference surfaces 213a, which are located on the outside of the camera casing 20. The position of the camera casing 20 is determined with respect to the front windshield 3. In particular, according to the first embodiment, since the optical assembly 30 and the camera casing 20 are joined via the adhesives 39, the assembly reference surfaces 351a, which are part of the optical assembly 30, are aligned on the imaginary plane P while being kept away from the inner wall surfaces 21a and 22a of the camera casing 20. Consequently, while reducing the demand for the surface accuracy of the inner wall surfaces 21a and 22a of the camera casing 20, the position of the assembly reference surfaces 351a relative to the casing reference surfaces 213a is accurately adjusted to the proper position on the imaginary plane P. This improves the image forming accuracy of the optical image in the optical assembly 30, and thus the imaging accuracy of the external environment 5.

According to the first embodiment, in which the joint sections S between the optical assembly 30 and the camera casing 20 via the adhesives 39 are located at symmetrical positions with respect to the optical axis Al, the position of the assembly reference surfaces 351a relative to the casing reference surfaces 213a is adjusted, so that the optical axis Al is prevented from being displaced. Consequently, decrease in the image forming accuracy that would otherwise be caused due to the displacement of the optical axis Al, and thus the decrease in the imaging accuracy, is inhibited.

According to the first embodiment, in which the assembly reference surfaces 351a are aligned on the imaginary plane P, which is orthogonal to the optical axis Al and extends along the casing reference surfaces 213a, the position of the assembly reference surfaces 351a relative to the casing reference surfaces 213a is adjusted. Thus, the ideal position of the optical axis Al is easily achieved. Consequently, the image forming accuracy and the imaging accuracy are increased.

The optical assembly 30 of the first embodiment forms the joint sections S by being joined to the camera casing 20 via the ultraviolet curing adhesives 39. The joint sections S are irradiated with ultraviolet light through the exposure window 219, which exposes the joint sections S to the outside of the camera casing 20 even before the joining. Thus, the adhesives 39 are cured using ultraviolet irradiation that is unlikely to cause damage or a modification to the optical assembly 30. Consequently, decrease in the image forming accuracy that would otherwise be caused due to damage or a modification to the optical assembly 30, and thus the decrease in the imaging accuracy, is inhibited.

In the optical assembly 30 of the first embodiment, the joint projections 352, which project with the spaces 352a located around the lens barrel 350, are joined to the camera casing 20 via the adhesives 39, so that the joint sections S are formed. Since the joint sections S are located on the opposite side of the joint projections 352 from the spaces 352a, even if the adhesives 39 are thermally expanded at the joint sections S, the joint projections 352 may escape toward the spaces 352a and are unlikely to press the lens barrel 350. Consequently, in regard to the imaging lens 36, which is accommodated in the lens barrel 350 to form an optical image, since the distortion of the lens barrel 350 that would otherwise be caused due to the depression by the joint projections 352 is inhibited, the image forming accuracy is inhibited from being decreased due to the distortion, and thus the imaging accuracy is inhibited from being decreased.

The joint sections S between the joint projections 352, which enter inside the exposure window 219, and the camera casing 20 like the first embodiment are easily irradiated with ultraviolet light through the exposure window 219 before joining. This reduces the curing time of the adhesives 39 so that the position of the assembly reference surfaces 351a relative to the casing reference surfaces 213a is inhibited from being displaced before joining. Furthermore, after the adhesives 39 are cured, the opening amount of the window 219 is reduced since the joint projections 352 enter the inside of the exposure window 219. This inhibits foreign matter from entering the inside of the camera casing 20 from the outside. With these configurations, combined with the reduction in the curing time of the adhesives 39 and the inhibition of the distortion of the lens barrel 350 as described above, a failure of the camera module 1 that would otherwise be caused by the entry of foreign matter is avoided while improving the image forming accuracy and thus the imaging accuracy.

In the camera casing 20 of the first embodiment, the exposure windows 219 are surrounded by the exposure surfaces 219a, which are inclined to separate further from the joint projections 352 toward the outside of the casing 20 and are joined to the joint projections 352 via the adhesives 39. With this configuration, although the manufacturing tolerances of the exposure windows 219 are not strictly controlled, the position of the assembly reference surfaces 351a relative to the casing reference surfaces 213a is adjusted while the manufacturing tolerances are absorbed by the joint gaps 352c between the joint projections 352, which enter the window 219, and the exposure surfaces 219a. Consequently, the decrease in the image forming accuracy due to the manufacturing tolerances of the exposure window 219, and thus the decrease in the imaging accuracy, is inhibited.

In the camera casing 20 of the first embodiment, the lens window 216 is surrounded by the inclined surfaces 216a, which are inclined to separate further from the lens barrel 350 toward the outside of the casing 20. With this configuration, although the manufacturing tolerances of the lens window 216 are not strictly controlled, the position of the assembly reference surfaces 351a relative to the casing reference surfaces 213a is adjusted while the manufacturing tolerances are absorbed by the gap between the window 216 and the lens barrel 350, which enters the lens window 216. Consequently, the decrease in the image forming accuracy due to the manufacturing tolerances of the exposure window 219, and thus the decrease in the imaging accuracy, is inhibited.

In the camera casing 20 of the first embodiment, the communication windows 218, which connect the exposure windows 219 to the lens window 216, expose the spaces 352a between the lens barrel 350 and the joint projections 352 to the outside of the casing 20. The communication windows 218, which have an opening narrower than that of the lens window 216, reduce the opening amount as much as possible to inhibit foreign matter from entering the inside of the camera casing 20 from the outside. Consequently, in addition to improving the image forming accuracy and the imaging accuracy by inhibiting the occurrence of the distortion of the lens barrel 350 as described above, the configuration avoids a failure of the camera module 1 that would otherwise be caused by the entry of foreign matter.

In the first embodiment, the joint projections 352 and the assembly reference surfaces 351a are formed on the same member of the optical assembly 30. With this configuration, although the manufacturing tolerances at the joint sections S between the camera casing 20 and the joint projections 352 are not strictly controlled, the position of the assembly reference surfaces 351a relative to the casing reference surfaces 213a is adjusted with the manufacturing tolerances being absorbed by increasing and decreasing the adhesives 39 at the joint sections S. Consequently, the decrease in the image forming accuracy due to the manufacturing tolerances of the camera casing 20, and thus the decrease in the imaging accuracy, is inhibited.

In the first embodiment, since the assembly reference surfaces 351a are aligned on the imaginary plane P, a curing completion process of the adhesives 39 located between the optical assembly 30 and the camera casing 20 is performed by ultraviolet irradiation through the exposure window 219. Thus, damage or a modification to the optical assembly 30 is unlikely to occur. This inhibits decrease in the image forming accuracy that would otherwise be caused due to damage or a modification to the optical assembly 30, and thus the decrease in the imaging accuracy.

Second Embodiment

Figure 15:
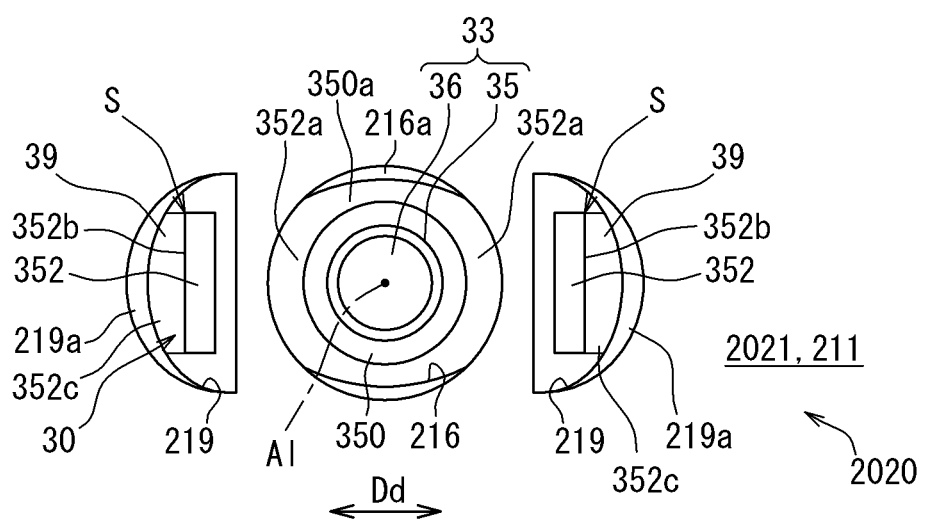
FIG. 15 is an enlarged front schematic diagram illustrating a camera casing and an optical assembly according to a second embodiment.

As shown in FIG. 15, a second embodiment is a modification of the first embodiment.

An upper casing member 2021 of a camera casing 2020 according to the second embodiment does not include the communication windows 218. Thus, the exposure windows 219 are separated to the left and the right from the lens window 216 and do not communicate with the window 216.

In the camera casing 2020 of the second embodiment, the opening area of the exposure windows 219, which are separate from the lens window 216, through which the lens barrel 350 is exposed, is set independently from the opening area of the lens window 216. With this configuration, the opening area of the exposure windows 219 is reduced as much as possible, so that foreign matter is inhibited from entering the inside of the camera casing 2020 from the outside. Consequently, in addition to improving the image forming accuracy and the imaging accuracy by inhibiting the occurrence of the distortion of the lens barrel 350 as in the first embodiment, a failure of the camera module 1 that would otherwise be caused due to the entry of the foreign matter is avoided.

Third Embodiment

Figure 16:
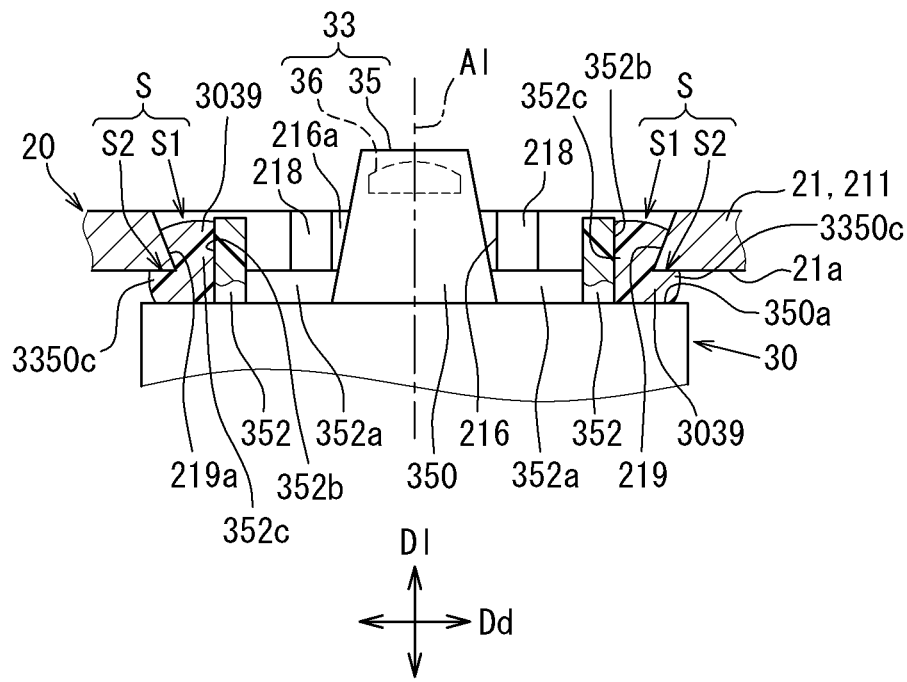
FIG. 16 is a partial cross-sectional schematic diagram illustrating a camera casing and an optical assembly according to a third embodiment.

As shown in FIG. 16, a third embodiment is a modification of the first embodiment.

Adhesives 3039 of the third embodiment are ultraviolet curing adhesives that are curable by exposure to ultraviolet light and are also thermosetting adhesives that are curable by heat. The joint sections S, at which the lens holder 35 of the lens unit 33 of the optical assembly 30 is joined to the upper casing member 21 of the camera casing 20 via the adhesives 3039, each include a first section S1 and a second section S2.

The first sections S1 are located at symmetrical positions on the left and right sides of the optical axis Al of the optical assembly 30. Like the joint sections S of the first embodiment, at each first section S1, the joint gap 352c between the assembly adhesion surface 352b of each joint projection 352 of the optical assembly 30 and the corresponding exposure surface 219a of the camera casing 20 is filled with the adhesive 3039. Thus, the first section S1, at which each assembly adhesion surface 352b is joined to the casing adhesion surface, which is the associated exposure surface 219a, is located on the opposite side of the joint projection 352 from the space 352a in the left and right orthogonal direction Dd among directions intersecting the optical axis direction Dl as shown in FIG. 16. Furthermore, the first sections S1 are located along the optical axis direction Dl as shown in FIG. 16. With the above configuration, at the first sections S1, the size of the joint gaps 352c is determined by the thickness of the cured adhesives 3039.

The second sections S2 are located at the symmetrical positions on the left and right sides of the optical axis Al to extend laterally outward of the lens barrel 350 from the first sections S1. At the second sections S2, joint gaps 3350c between the flat surface 350a of the lens barrel 350 of the optical assembly 30 and the wall surface 21a inside the curved wall portion 211 of the camera casing 20 are filled with the adhesives 3039. Thus, each second section S2, at which the assembly adhesion surface, which is the flat surface 350a, is joined to the casing adhesion surface, which is the wall surface 21a, bulges from the corresponding first section S1 located laterally inward, so that the second section S2 is located on the opposite side of the joint projection 352 from the space 352a in the orthogonal direction Dd shown in FIG. 16. Furthermore, the second sections S2 are located along the orthogonal direction Dd shown in FIG. 16. With the above configuration, at the second sections S2, the size of the joint gaps 3350c is determined by the thickness of the cured adhesives 3039.

Since the flat surface 350a of the lens barrel 350 does not need to be additionally polished, the flat surface 350a has a lower surface accuracy than the surface accuracy of the casing reference surfaces 213a and the assembly reference surfaces 351a, which require additional polishing. Similarly, since the wall surfaces 21a and 22a of the camera casing 20 do not require additional polishing, the wall surface 21a has the surface accuracy lower than the surface accuracy of the casing reference surfaces 213a and the assembly reference surfaces 351a, which require additional polishing.

With the above-described detailed structure being employed, the adhesives 3039 in the first sections S1 and the adhesives 3039 in the second sections S2 are mounted between the optical assembly 30 and the camera casing 20 on both sides of the optical axis Al continuously like an anchor.

Figure 17:
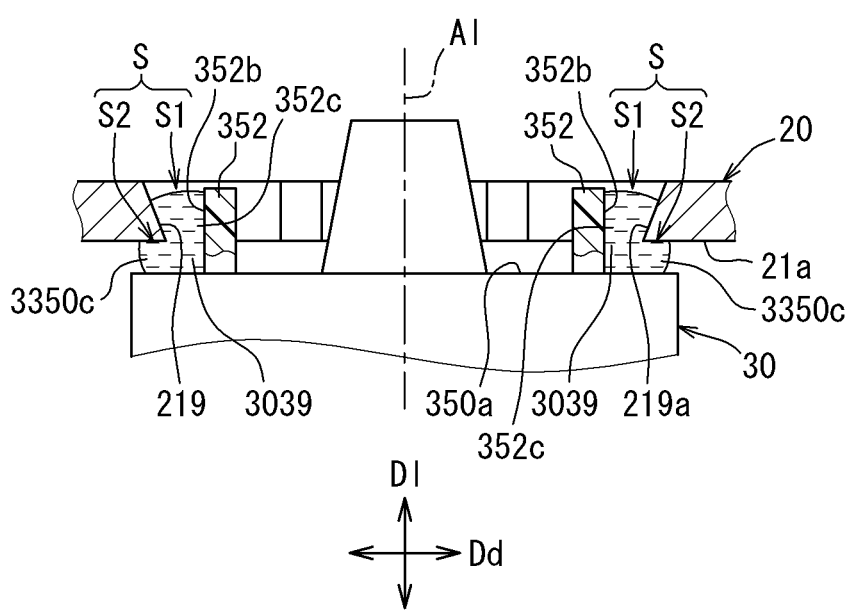
FIG. 17 is a partial cross-sectional schematic diagram illustrating a method for manufacturing the camera module according to the third embodiment.

The manufacturing of the third embodiment employing such a detailed structure includes a placing process shown in FIG. 17. More specifically, in an alignment placing process, the joint gaps 352c and 3350c are formed in accordance with the 6-axis adjustment of the relative position like the first embodiment. The placing process as above further applies the adhesives 3039, which are in the form of a gel or liquid before curing, to at least either of the assembly adhesion surfaces 352b or the exposure surfaces 219a and at least either of the flat surface 350a or the wall surface 21a while the securing of the assembly reference surfaces 351a to the jig 60 and the securing of the casing reference surfaces 213a to the jig 60 are sequentially executed. Thus, after the securing of the assembly reference surfaces 351a and the casing reference surfaces 213a are completed, the adhesives 3039 are placed in the joint gaps 352c between the assembly adhesion surfaces 352b and the exposure surfaces 219a along the optical axis direction Dl, so that the first sections S1 are formed. Additionally, after the securing of the assembly reference surfaces 351a and the casing reference surfaces 213a are completed, the adhesives 3039 are placed in the joint gaps 3350c between the flat surface 350a and the wall surface 21a along the orthogonal direction Dd, so that the second sections S2 are formed. The same applies to the order of securing the assembly reference surfaces 351a and the casing reference surfaces 213a as in the first embodiment.

Figure 18:
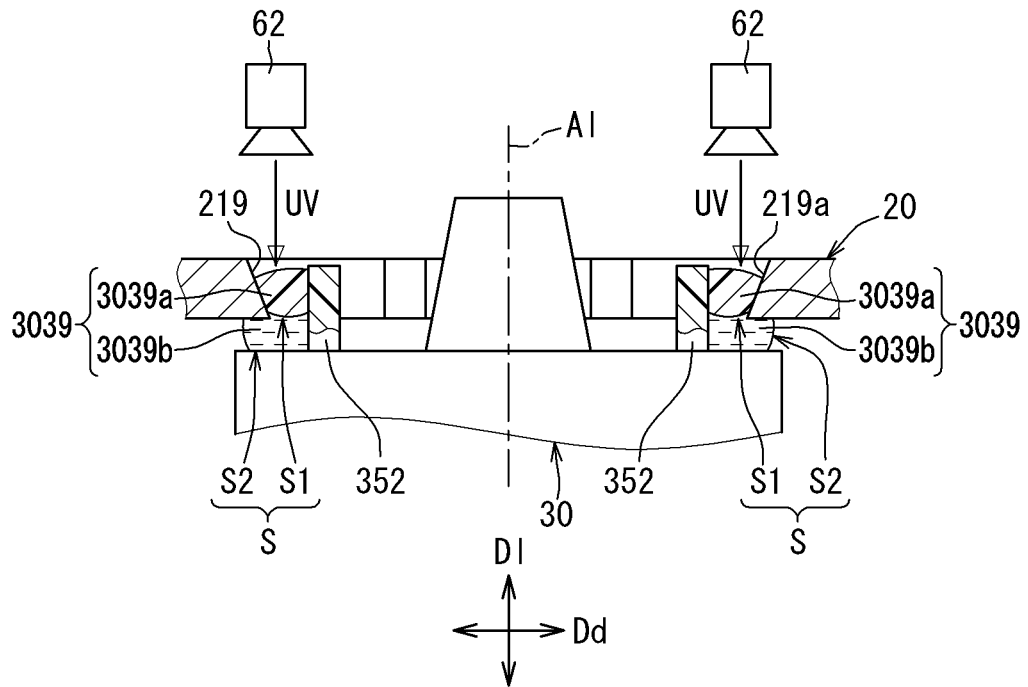
FIG. 18 is a partial cross-sectional schematic diagram illustrating the method for manufacturing the camera module according to the third embodiment.

Subsequently, in a temporary curing process according to the third embodiment shown in FIG. 18, while the alignment of the assembly reference surfaces 351a on the imaginary plane P is maintained by the jig 60 (not shown), the adhesives 3039 that have been placed are irradiated with ultraviolet light through the exposure window 219 of the camera casing 20, so that the adhesives 3039 are temporarily cured. At this time, ultraviolet light is emitted from the ultraviolet emitters 62 like those in the first embodiment. Thus, ultraviolet light is emitted from the ultraviolet emitters 62 along the optical axis direction Dl.

In the temporary curing process as above, at the first sections S1 along the optical axis direction Dl, parts 3039a of the adhesives 3039 exposed to the outside of the camera casing 20 through the exposure window 219 are irradiated with ultraviolet light from the ultraviolet emitters 62, respectively. As a result, at the first sections S1 between the joint projections 352 and the exposure surfaces 219a, the parts 3039a of the adhesives 3039 to which ultraviolet light reaches along the optical axis direction Dl are cured by the progress of the photopolymerization reaction. At this time, at the second sections S2 along the orthogonal direction Dd, parts of the adhesives 3039 out of the exposure window 219 and hidden in the camera casing 20 are uncured and are defined as remaining parts 3039b.

Figure 19:
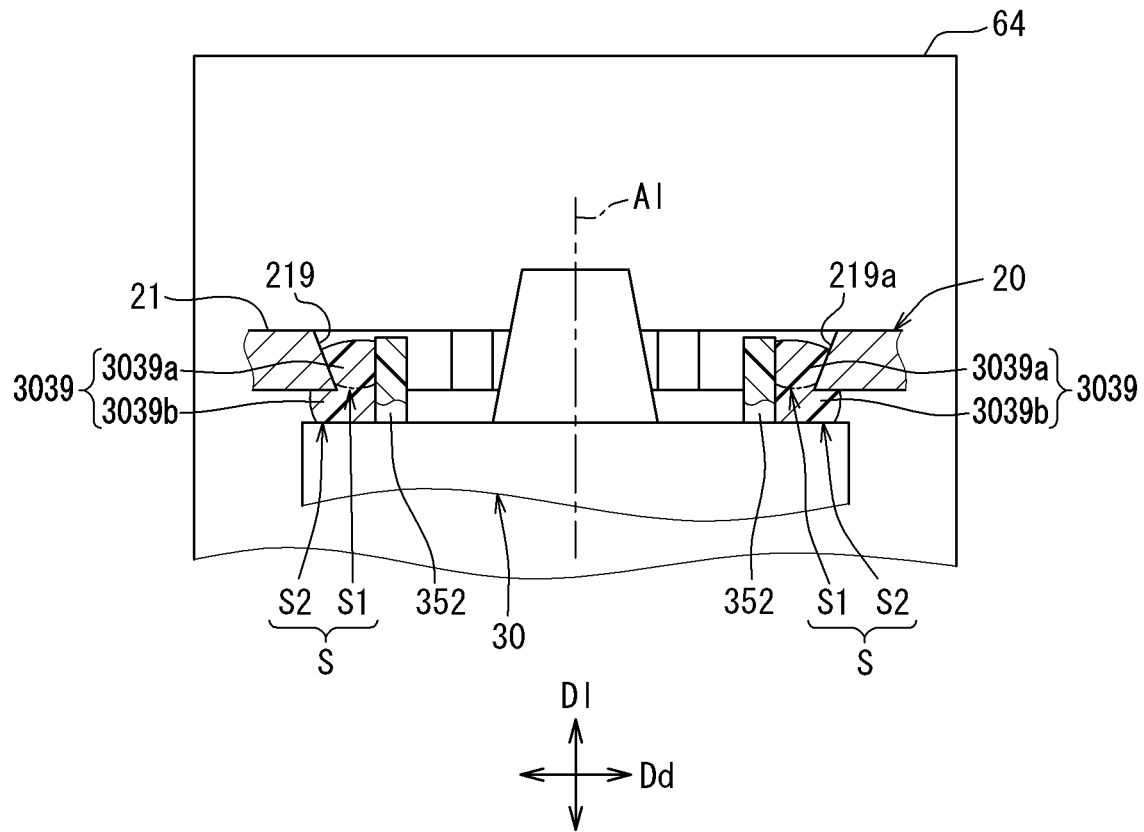
FIG. 19 is a partial cross-sectional schematic diagram illustrating the method for manufacturing the camera module according to the third embodiment.

Further subsequently, in a thermosetting process according to the third embodiment shown in FIG. 19, the adhesives 3039 after being placed and temporarily cured are heated while the alignment of the assembly reference surfaces 351a on the imaginary plane P is maintained by the jig 60 (not shown), or while the alignment is maintained by the temporarily cured adhesives 3039, so that the adhesives 3039 are thermally cured. The heating is performed by putting an integral object of the upper casing member 21, the optical assembly 30, and the adhesives 3039 in, for example, a heating device 64 such as a furnace or a heating tank under a temperature of approximately 80 to 120° C.

The thermosetting process as above heats the remaining parts 3039b located out of the exposure window 219 and hidden inside the camera casing 20 as the adhesives 3039 at the second sections S2 along the orthogonal direction Dd. As a result, at the second sections S2 between the flat surface 350a and the wall surface 21a, the remaining parts 3039b along the orthogonal direction Dd are cured by the progress of thermal polymerization reaction. The heating process on the second sections S2 is continued for the time during which the curing of substantially the entire adhesives 3039 is assumed to be completed, so that the position of the optical assembly 30 relative to the camera casing 20 is determined together with the size of the joint gaps 352c and 3350c. The thermosetting and ultraviolet curing adhesives 39 are, for example, epoxy resin.

In the third embodiment described above, since the assembly reference surfaces 351a are aligned on the imaginary plane P, the temporary curing process of the adhesives 3039 located between the optical assembly 30 and the camera casing 20 is performed by the exposure of the parts 3039a of the adhesives 3039 to ultraviolet light through the exposure window 219. Consequently, damage or a modification to the optical assembly 30 is unlikely to occur. Moreover, since the thermosetting process through heating performed after the temporary curing process is limited to the remaining parts 3039b of the adhesives 3039 that are uncured in the temporary curing process, the thermosetting process is finished in a short time, so that damage or a modification to the optical assembly 30 is unlikely to occur. These configurations inhibit decrease in the image forming accuracy that would otherwise be caused due to damage or a modification to the optical assembly 30, and thus the decrease in the imaging accuracy.

Fourth Embodiment

Figure 20:
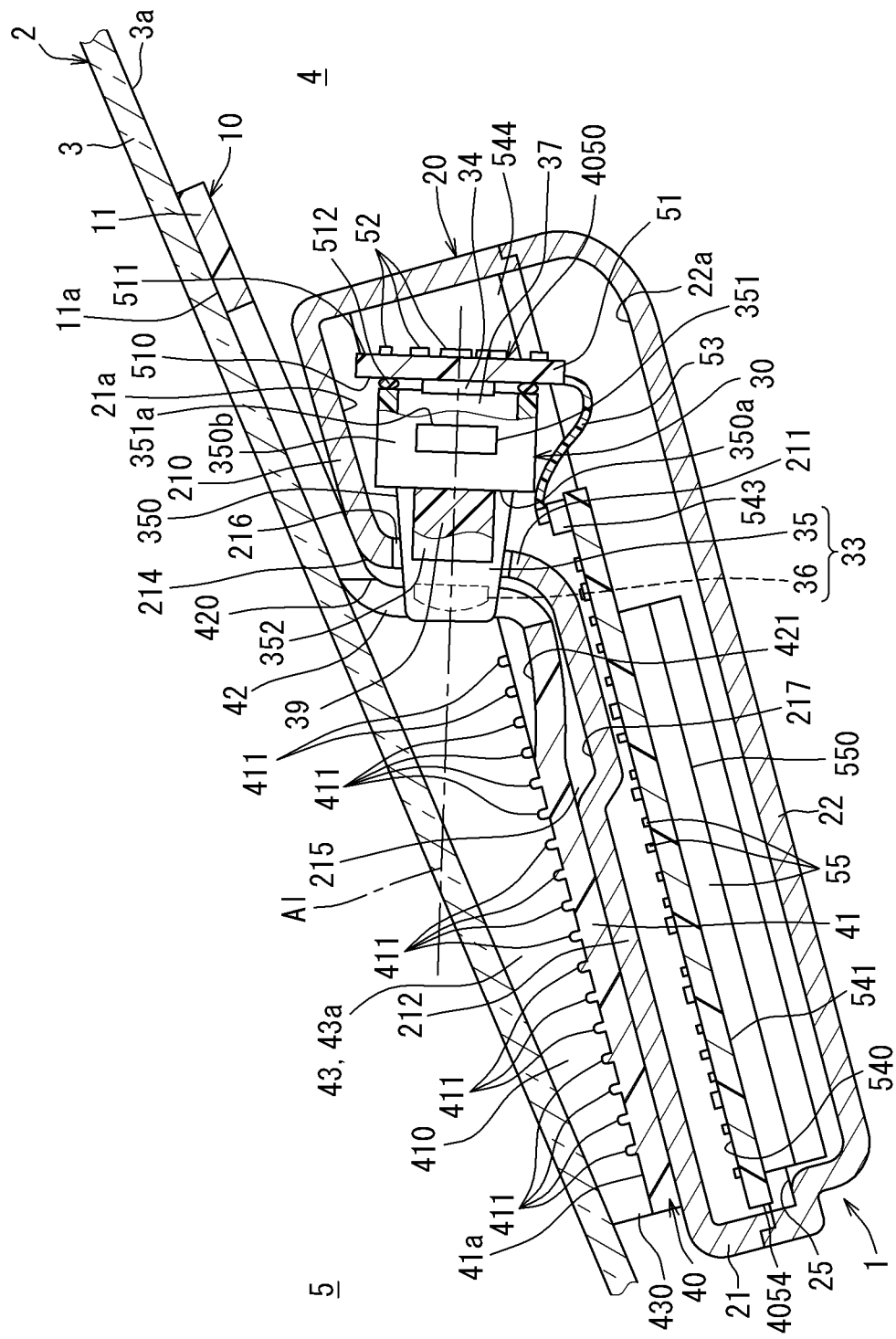
FIG. 20 is a longitudinal cross-sectional view of a camera module according to a fourth embodiment.

As shown in FIG. 20, a fourth embodiment is a modification of the first embodiment.

A control substrate 4054 of a circuit unit 4050 according to the fourth embodiment has substantially the same structure as the control substrate 54 of the first embodiment except that the connection hole 542 is not formed, and the internal connector 543 is mounted on the upper mounting surface 540. Thus, the imaging substrate 51 is connected to the internal connector 543 through the FPC 53, which snakes around the outer circumferential side of the control substrate 4054. The imaging substrate 51 may be connected to the internal connector 543, which is mounted on the upper mounting surface 540 of the control substrate 4054, without the FPC 53.

The fourth embodiment as above includes the casing member 20, the optical assembly 30, and the adhesives 39 like the first embodiment. Consequently, the fourth embodiment also has the operational advantages that are the same as those of the first embodiment.

Fifth Embodiment

Figure 21:
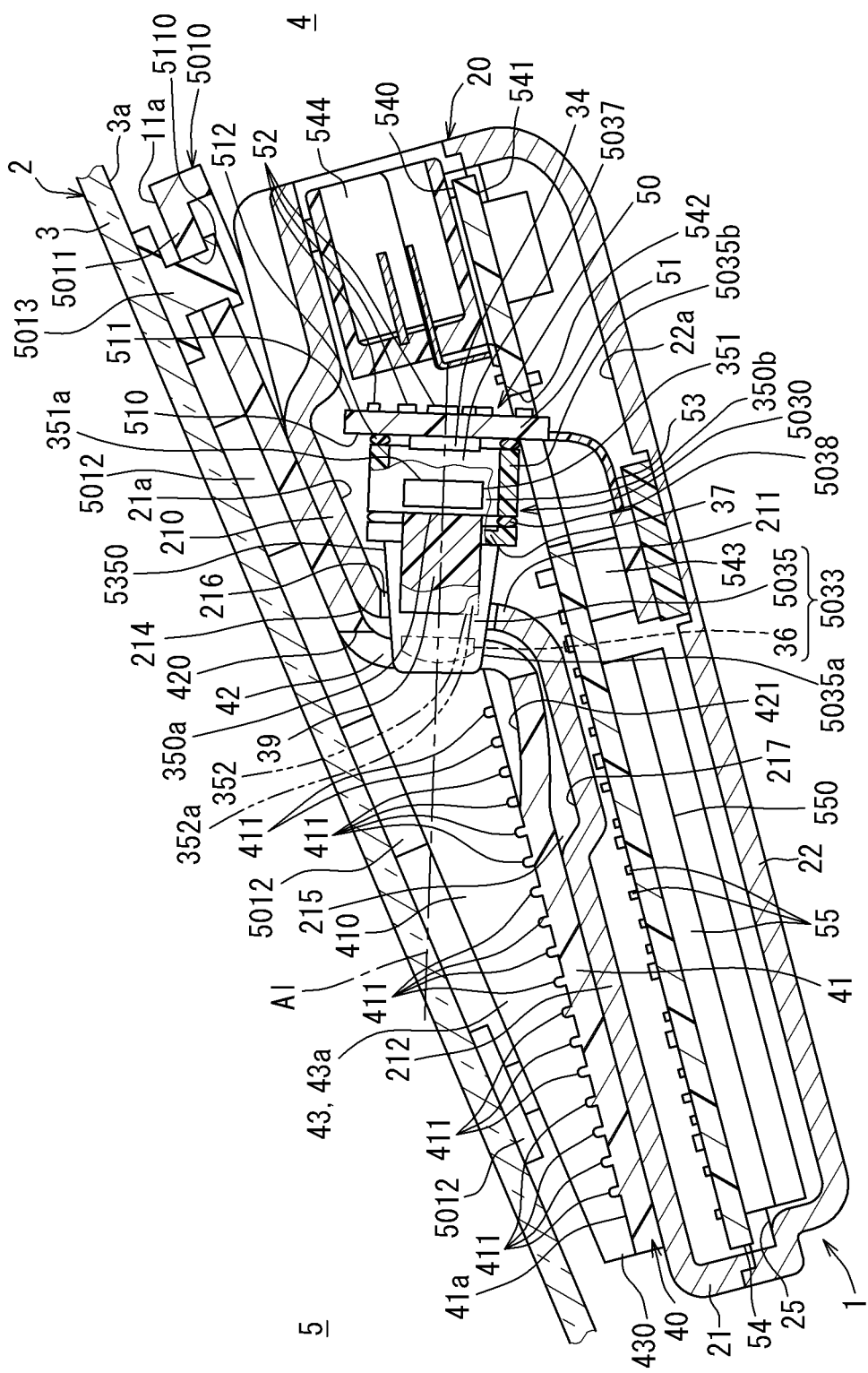
FIG. 21 is a longitudinal cross-sectional view of a camera module according to a fifth embodiment.

As shown in FIG. 21, a fifth embodiment is a modification of the first embodiment.

A bracket assembly 5010 of the fifth embodiment is configured by combining mounting cushions 5012 and mounting pads 5013 to a bracket main body 5011, which has a different structure from that of the first embodiment.

The bracket main body 5011 includes the mounting cushions 5012 made of, for example, an elastomer having a shock absorption function. The bracket main body 5011 includes mounting slots 5110, which extend through both sides of the bracket main body 5011. The mounting pads 5013 are provided individually corresponding to the mounting slots 5110. The mounting pads 5013 are formed by, for example, attaching an adhesive sheet having a shock absorption function to a base material such as plastic. The base material of each mounting pad 5013 is securely fitted to the corresponding mounting slot 5110 to be retained by the bracket main body 5011. The adhesive sheets of the mounting pads 5013 are securely attached to the inner surface 3a of the front windshield 3. Thus, in the vehicle 2, the bracket assembly 5010 is detachably mounted on the windshield 3 with the mounting cushions 5012 sandwiched between the bracket assembly 5010 and the front windshield 3. The mounting pads 5013 may be, for example, suction pads made of, for example, an elastomer having a shock absorption function.

In an optical assembly 5030 of the fifth embodiment, a lens holder 5035 of a lens unit 5033 includes a front holder 5035a and a rear holder 5035b.

The front holder 5035a is formed of, for example, hard material that is relatively easily molded such as plastic into a stepped cylinder. The structure of the lens barrel 5350 of the front holder 5035a is substantially the same as that of the lens barrel 350 of the first embodiment except that the flat surface 350a is not provided.

The rear holder 5035b is formed of, for example, hard material that is relatively easily molded such as plastic into a stepped cylinder. The front end portion of the rear holder 5035b is joined to the rear end portion of the front holder 5035a with an adhesive 5038 to be coaxial. An optical path space 5037 surrounded by the rear holder 5035b communicates with the optical path space 37 surrounded by the lens barrel 5350 at the front holder 5035a. The rear end portion of the rear holder 5035b is joined to the imaging substrate 51 with the adhesive 512, so that the optical path space 5037 in which the imager 34 is located is closed from the rear side. As above, the optical image that has passed through the front windshield 3 from the external environment 5 is sequentially introduced through the optical path spaces 37 and 5037 by the lens unit 5033 including the imaging lens 36 and is formed on the imager 34.

The flat surface 350a of the first embodiment is located on the rear holder 5035b in the fifth embodiment. The rear holder 5035b includes the positioning sections 351, which form the assembly reference surfaces 351a, and the joint projections 352, which define the spaces 352a between the joint projections 352 and the lens barrel 5350 to be laterally symmetrical, one on each side, and integral. Thus, the assembly reference surfaces 351a on both left and right sides are made of the same member as the joint projections 352 on both left and right sides, but are made of a different member from the lens barrel 5350.

In the fifth embodiment as above, the optical assembly 5030, which includes the lens barrel 5350 as described above in addition to the assembly reference surfaces 351a and the joint projections 352, is provided together with the casing member 20 and the adhesives 39 like the first embodiment. Consequently, the fifth embodiment also has the operational advantages that are the same as those of the first embodiment.

Modifications

Although the present disclosure has been described in connection with the above embodiments, it should be understood that such embodiments are not restrictive, and that various embodiments and combinations can be made without departing from the scope of the present disclosure. In the following description, FIGS. 22 to 27 typically illustrate modifications to the first embodiment.

Figure 22:
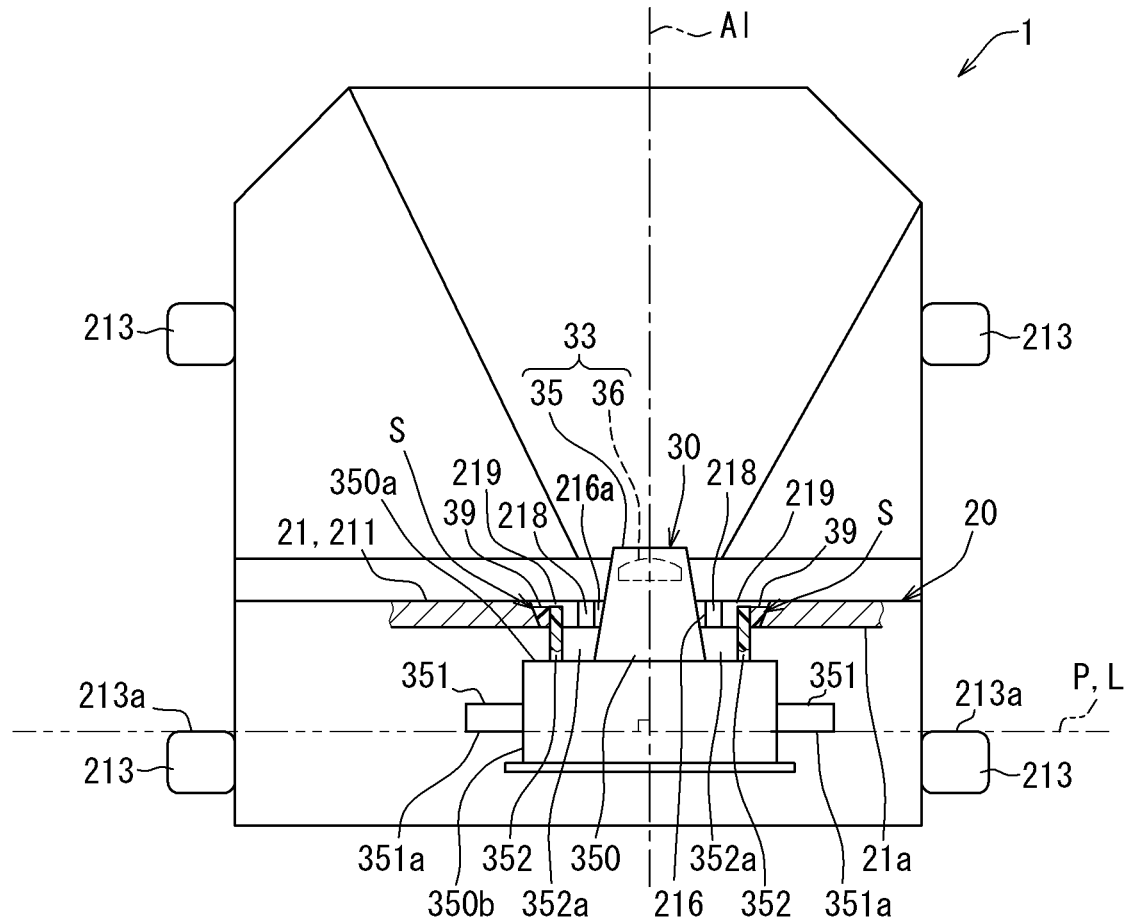
FIG. 22 is a partial cross-sectional schematic diagram illustrating a modification of FIG. 9.

More specifically, in a first modification of the first to fifth embodiments, as shown in FIG. 22, the casing reference surfaces 213a may be assumed to align with the imaginary plane P. In a second modification of the first to fifth embodiments, the assembly reference surfaces 351a may be formed with the front surfaces of the positioning sections 351 that are assumed on the imaginary plane P. In a third modification of the first to fifth embodiments, the imaginary plane P may be assumed to intersect the optical axis Al at an acute angle or an obtuse angle.

In a fourth modification of the first to fifth embodiments, the joint sections S (S1, S2) may be located to be vertically symmetrical with respect to the optical axis Al. In a fifth modification of the first to fifth embodiments, the joint sections S (S1, S2) may be formed continuously all around the optical axis Al, so that the joint sections S (S1, S2) are located at laterally symmetrical positions with respect to the optical axis Al and vertically symmetrical positions with respect to the optical axis Al. In a sixth modification of the first to fifth embodiments, the joint projections 352 may be located on only one side of the optical axis Al. In a seventh modification of the third embodiment, the second sections S2 may be formed in a direction other than the orthogonal direction Dd among the directions intersecting the optical axis direction Dl.

Figure 23:
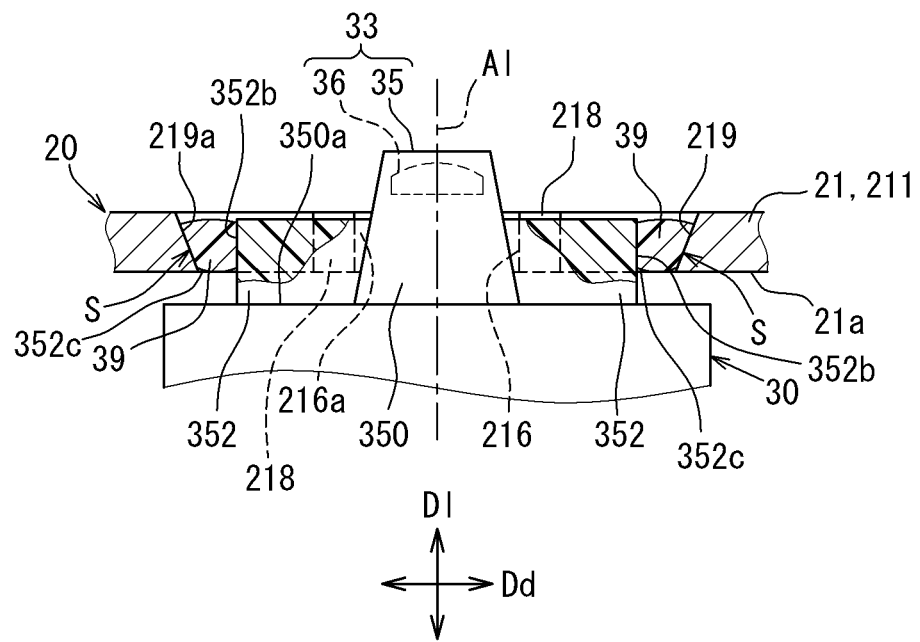
FIG. 23 is a partial cross-sectional schematic diagram illustrating a modification of FIG. 10.
Figure 24:
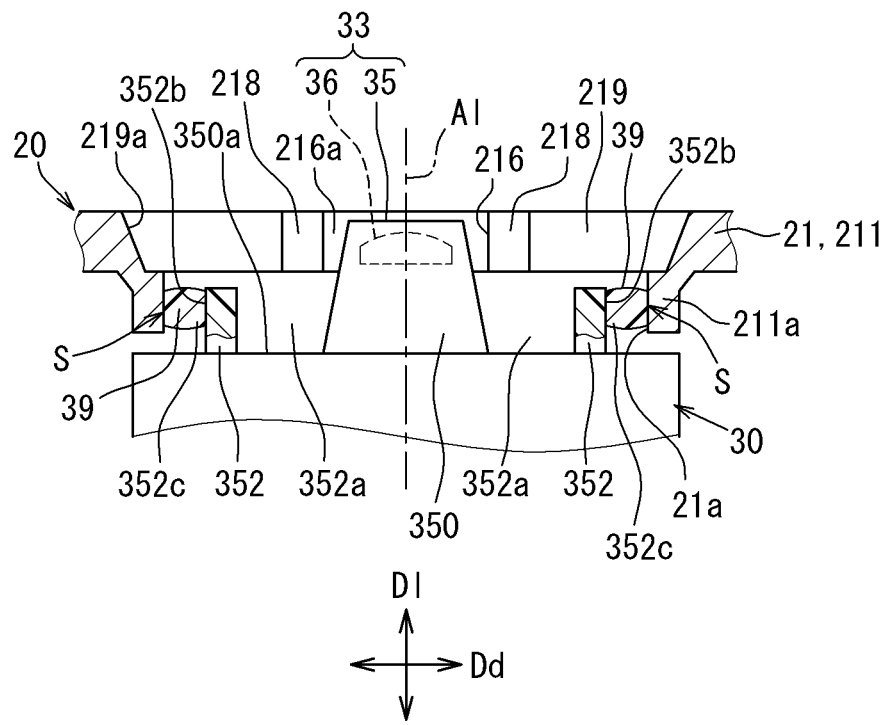
FIG. 24 is a partial cross-sectional schematic diagram illustrating a modification of FIG. 10.
Figure 25:
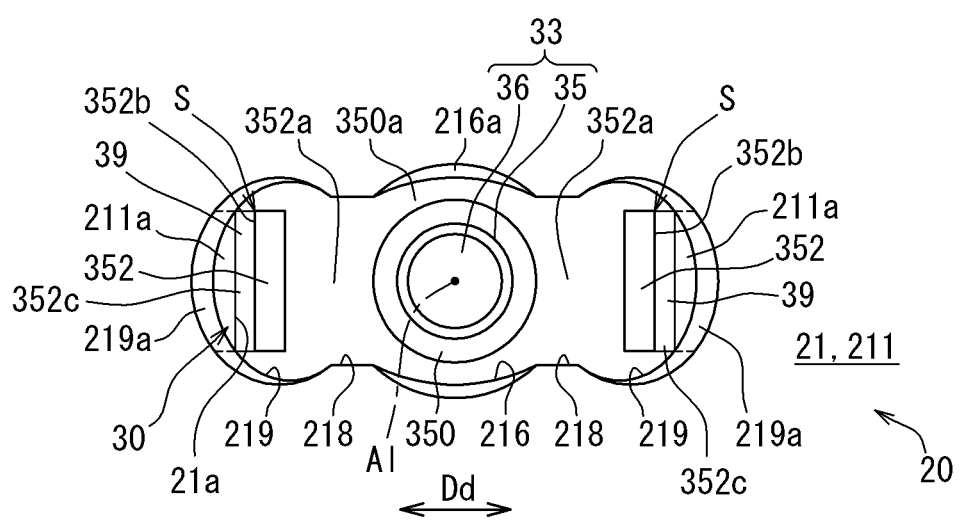
FIG. 25 is a front schematic diagram illustrating a modification of FIG. 11.

In an eighth modification of the first to fifth embodiments, as shown in FIG. 23, the spaces 352a do not necessarily have to be provided between the joint projections 352 and the lens barrel 350. In a ninth modification of the first to fifth embodiments, as shown in FIG. 24, the joint projections 352 do not necessarily have to enter inside the exposure window 219. In the ninth modification, as shown in FIGS. 24 and 25, the curved wall portion 211 may include rim portions 211a at positions of the inner wall surface 21a facing the assembly adhesion surfaces 352b of the joint projections 352 with joint gaps 352c formed in between. The rim portions 211a and the joint projections 352 may be joined with the adhesives 39 and 3039. In a tenth modification of the first to fifth embodiments, the assembly reference surfaces 351a and the joint projections 352 may be formed on different members.

Figure 26:
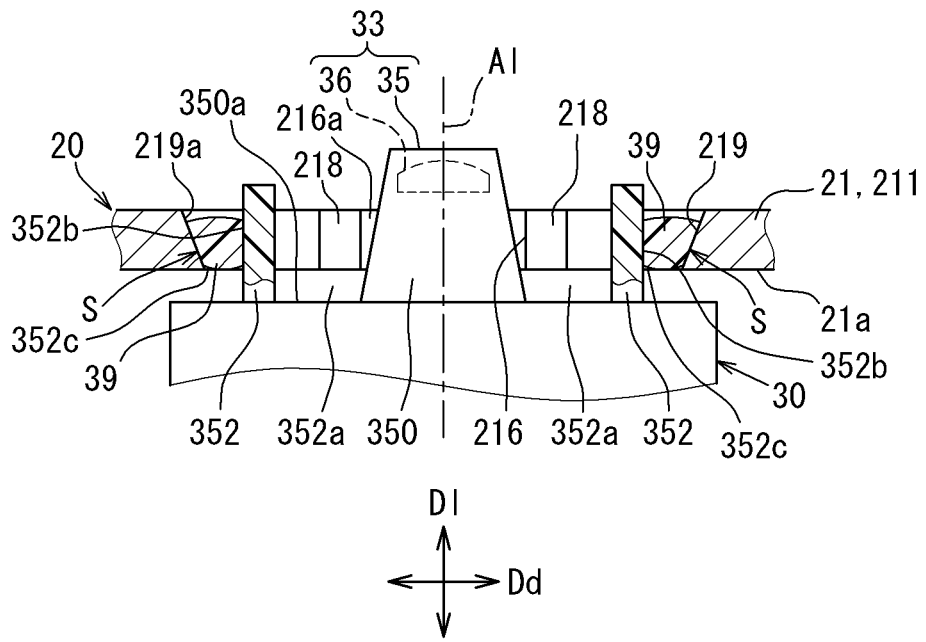
FIG. 26 is a partial cross-sectional schematic diagram illustrating a modification of FIG. 10.

In an eleventh modification of the first to fifth embodiments, as shown in FIG. 24, the lens barrel 350 or 5350 enters the inside of the lens window 216 but does not necessarily have to project outside of the window 216. In a twelfth modification of the first to fifth embodiments, as shown in FIG. 26, the joint projections 352 may enter the inside of the exposure window 219 and may further project outside of the window 219.

Figure 27:
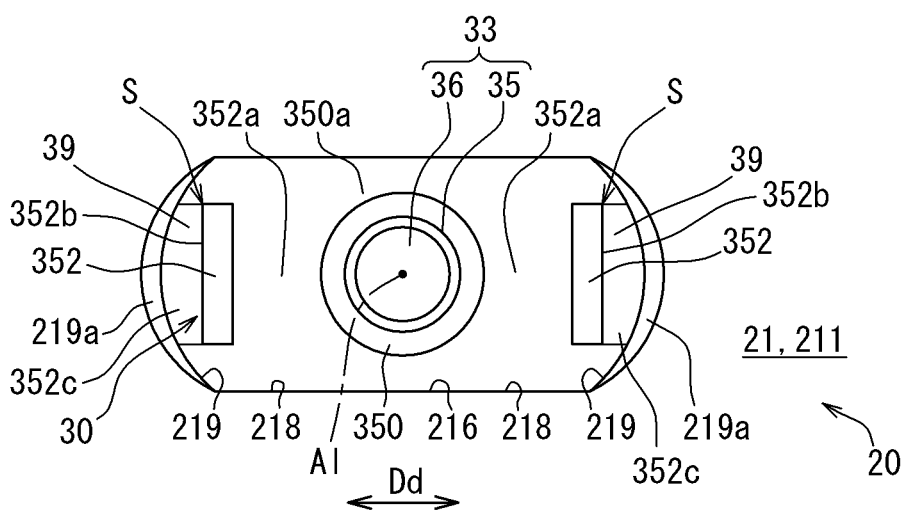
FIG. 27 is a front schematic diagram illustrating a modification of FIG. 11.

In a thirteenth modification of the first and third to fifth embodiments, as shown in FIG. 27, the communication windows 218 do not necessarily have to be narrower than the lens window 216 and the exposure windows 219, and the windows 218, 216, and 219 may together form a substantially rectangular shape. In a fourteenth modification of the third to fifth embodiments, the communication windows 218 do not necessarily have to be provided as according to the second embodiment. In a fifteenth modification of the second, fourth, and fifth embodiments, the first sections S1 along the optical axis direction Dl and the second sections S2 along the intersecting direction such as the orthogonal direction Dd may be included in the joint sections S as according to the third embodiment. In a sixteenth modification of the first, second, fourth, and fifth embodiments, the temporary curing process performed by ultraviolet irradiation and the thermosetting process performed by heating according to the third embodiment may be executed to the joint sections S located substantially along only the optical axis direction Dl.

The surfaces 219a of a seventeenth modification of the first to fifth embodiments may be formed to be substantially parallel to the optical axis Al and do not necessarily have to be inclined. The surfaces 216a of an eighteenth modification of the first to fifth embodiments may be formed to be substantially parallel to the optical axis Al and do not necessarily have to be inclined. In a nineteenth modification of the first to fifth embodiments, the sections of the curved wall portion 211 surrounding the communication windows 218 may be inclined to separate further from the vertically middle portion of the window 218 toward the front side, that is, toward the outside of the camera casing 20.

In the placing process according to a twentieth modification of the first, second, fourth, and fifth embodiments, the adhesives 39 may be applied to at least either the assembly adhesion surfaces 352b or the exposure surfaces 219a before or after the securing of the assembly reference surfaces 351a to the jig 60 and the securing of the casing reference surfaces 213a to the jig 60. In the placing process according to a twenty-first modification of the third embodiment, the adhesives 3039 may be applied to at least either the assembly adhesion surfaces 352b or the exposure surfaces 219a and at least either the flat surface 350a or the wall surface 21a before or after the securing of the assembly reference surfaces 351a to the jig 60 and the securing of the casing reference surfaces 213a to the jig 60.

In a twenty-second modification of the first to fifth embodiments, the alignment state using the jig 60 (that is, the securing state of the reference surfaces 213a and 351a) may be removed from the middle of the curing process or the temporary curing process. In a twenty-third modification of the third embodiment, the alignment state using the jig 60 (that is, the securing state of the reference surfaces 213a and 351a) may be removed prior to the thermosetting process.

In a twenty-fourth modification of the second, third, and fifth embodiments, the circuit unit 4050 according to the fourth embodiment may be employed. In a twenty-fifth modification of the second to fourth embodiments, the bracket assembly 5010 and the optical assembly 5030 according to the fifth embodiment may be employed. Besides the above, in a twenty-sixth modification of the first to fifth embodiments, the camera module 1 may be mounted on the inner side of a rear windshield of the vehicle 2. In this case, the positional relationship in the front-and-rear direction is the reverse to that in the first to fifth embodiments.

In addition to the above, according to a modification of the present disclosure, a camera module (1) mounted on a vehicle (2) includes an optical assembly (30, 5030) and a camera casing (20, 2020). The optical assembly (30, 5030) includes an imaging lens (36), an assembly reference surface (351a), and an assembly adhesion surface (352b, 350a), which has a surface accuracy lower than the surface accuracy of the assembly reference surface. The camera casing (20, 2020) includes a casing reference surface (213a) and a casing adhesion surface (219a, 21a), which has a surface accuracy lower than the surface accuracy of the casing reference surface, and accommodates the optical assembly. As the position of the assembly reference surface relative to the casing reference surface is adjusted so that an optical axis (Al) of the imaging lens is oriented to a predetermined region to be imaged (410), an adhesive (39, 3039) is placed in a joint gap (352c, 3350c) formed between the assembly adhesion surface and the casing adhesion surface.

According to another modification of the present disclosure, camera module (1) mounted on a vehicle (2) includes an optical assembly (30, 5030), a camera casing (20, 2020), and an adhesive (39, 3039). The optical assembly (30, 5030) includes an imaging lens (36), an assembly reference surface (351a), and an assembly adhesion surface (352b, 350a), which has a surface accuracy lower than the surface accuracy of the assembly reference surface. The camera casing (20, 2020) includes a casing reference surface (213a) and a casing adhesion surface (219a, 21a), which has a surface accuracy lower than the surface accuracy of the casing reference surface, and accommodates the optical assembly. The adhesive (39, 3039) is located in a joint gap (352c, 3350c) between the assembly adhesion surface and the casing adhesion surface. The size of the joint gap is determined by the thickness of the adhesive, and an optical axis (Al) of the imaging lens is oriented toward a predetermined region to be imaged (410).

According to another modification of the present disclosure, a camera module (1) mounted on a vehicle (2) includes an optical assembly (30, 5030), a camera casing (20, 2020), and an adhesive (39, 3039). The optical assembly (30, 5030) includes an imaging lens (36) and an assembly adhesion surface (352b, 350a). The camera casing (20, 2020) includes a casing adhesion surface (219a, 21a) and accommodates the optical assembly. The adhesive (39, 3039) is located in a joint gap (352c, 3350c) between the assembly adhesion surface and the casing adhesion surface. The size of the joint gap is determined by the thickness of the adhesive, and an optical axis (Al) of the imaging lens is oriented toward a predetermined region to be imaged (410).

According to another modification of the present disclosure, a camera module (1) mounted on a vehicle (2) includes an optical assembly (30, 5030) and a camera casing (20, 2020). The optical assembly (30, 5030) includes an imaging lens (36), an assembly reference surface (351a), and an assembly adhesion surface (352b, 350a), which has a surface accuracy lower than the surface accuracy of the assembly reference surface. The camera casing (20, 2020) includes a casing reference surface (213a) and a casing adhesion surface (219a, 21a), which has a surface accuracy lower than the surface accuracy of the casing reference surface, and accommodates the optical assembly. The camera module is manufactured by securing the assembly reference surface to a jig (60), securing the casing reference surface to the jig, placing an adhesive (39, 3039) between the assembly adhesion surface and the casing adhesion surface, and determining the position of the optical assembly relative to the camera casing so that an optical axis (A1) of the lens is oriented toward a predetermined region to be imaged (410).

In summary, a first aspect of the present disclosure provides a camera module mountable to an inner side of a windshield of a vehicle and configured to capture an image of an external environment of the vehicle includes an optical assembly, a camera casing, and an adhesive. The optical assembly includes an assembly reference surface for determining a position of an optical axis and capture an image of the external environment by forming an optical image incident along the optical axis from the external environment. The camera casing includes a casing reference surface to be positioned with respect to the windshield on the outside of the camera casing and accommodates the optical assembly in a state separate from an inner wall surface. The adhesive joins the optical assembly to the camera casing in a state in which the assembly reference surface is aligned with an imaginary plane extending along the casing reference surface.

In the optical assembly of the first aspect, the assembly reference surface, which determines the position of the optical axis, is aligned with the imaginary plane extending along the casing reference surface located on the outside of the camera casing, which is positioned with respect to the windshield. In particular, according to the first aspect, since the optical assembly and the camera casing are joined via the adhesive, the assembly reference surface, which is part of the optical assembly, is aligned with the imaginary plane while being separated from the inner wall surface of the camera casing. Consequently, while reducing the demand for the surface accuracy of the inner wall surface of the camera casing, the position of the assembly reference surface relative to the casing reference surface is accurately adjusted to a proper position on the imaginary plane. This improves the image forming accuracy of the optical image in the optical assembly, and thus the imaging accuracy of the external environment.

According to a second aspect of the present disclosure provides the camera casing includes an exposure window. The sections, at which the optical assembly and the camera casing are joined via the adhesive including an ultraviolet curing property, are exposed to the outside of the camera casing through the exposure window.

According to a third aspect of the present disclosure, the optical assembly includes a lens barrel, which accommodates an imaging lens that forms the optical image, and a joint projection, which projects in the vicinity of the lens barrel with a space provided in between. The sections, at which the joint projection and the camera casing are joined via the adhesive, are located on the opposite side of the joint projection from the space.

According to a fourth aspect of the present disclosure, the camera casing includes an exposure window. The optical assembly includes a lens barrel, which accommodates an imaging lens that forms the optical image, and a joint projection, which projects in the vicinity of the lens barrel with a space provided in between. The sections, at which the joint projection and the camera casing are joined via the adhesive including an ultraviolet curing property, are located on the opposite side of the joint projection from the space and are exposed to the outside of the camera casing through the exposure window.

The optical assembly of the second and the fourth aspects is joined to the camera casing via the ultraviolet curing adhesive to form the joint sections. The joint sections are irradiated with ultraviolet light through the exposure window, which exposes the sections to the outside of the camera casing even before joining. With this configuration, the adhesive is cured using ultraviolet irradiation that is unlikely to cause damage or a modification to the optical assembly. Consequently, decrease in the image forming accuracy that would otherwise be caused due to damage or a modification to the optical assembly, and thus the decrease in the imaging accuracy, is inhibited.

In the optical assembly of the third and fourth aspects, the joint projection, which projects in the vicinity of the lens barrel with the space provided in between, is joined with the camera casing via the adhesive to form the joint sections. Since the joint sections are located on the opposite side of the joint projection from the space, even if the adhesive is thermally expanded at the joint sections, the joint projection may escape toward the space and is unlikely to press the lens barrel. Consequently, in regard to the imaging lens, which is accommodated in the lens barrel and forms an optical image, the distortion of the lens barrel that would otherwise be caused due to the depression by the joint projection is inhibited. Thus, decrease in the image forming accuracy that would otherwise be caused due to distortion, and thus the decrease in the imaging accuracy, is inhibited.

According to a fifth aspect of the present disclosure, a method for manufacturing the camera module of the second or fourth aspect includes placing the adhesive between the optical assembly and the camera casing while the assembly reference surface is aligned on the imaginary plane. Curing of the adhesive is completed by irradiating the adhesive that has been placed with ultraviolet light through the exposure window.

Like the fifth aspect, since the assembly reference surface is aligned on the imaginary plane, the curing completion process of the adhesive located between the optical assembly and the camera casing is performed by the ultraviolet irradiation through the exposure window. Thus, damage or a modification to the optical assembly is unlikely to occur. This inhibits decrease in the image forming accuracy that would otherwise be caused due to damage or a modification to the optical assembly, and thus the decrease in the imaging accuracy.

According to a sixth aspect of the present disclosure, a method for manufacturing the camera module according to the second or fourth aspect includes placing the adhesive between the optical assembly and the camera casing while the assembly reference surface is aligned on the imaginary plane. A part of the adhesive is temporarily cured by irradiating the adhesive that has been placed with ultraviolet light through the exposure window. A remaining part of the adhesive is thermoset by heating the adhesive that has been temporarily cured.

Like the sixth aspect, since the assembly reference surface is aligned on the imaginary plane, the temporary curing process of the adhesive located between the optical assembly and the camera casing is performed by irradiating part of the adhesive with ultraviolet light through the exposure window. Consequently, damage or a modification to the optical assembly is unlikely to occur. Moreover, since the thermosetting process through heating performed after the temporary curing process is limited to the remaining part of the adhesive that is uncured in the temporary curing process, the thermosetting process is finished in a short time, so that damage or a modification to the optical assembly is unlikely to occur. These configurations inhibit decrease in the image forming accuracy that would otherwise be caused due to damage or a modification to the optical assembly, and thus the decrease in the imaging accuracy.

What is claimed is:

1. A camera module mountable to an inner side of a windshield of a vehicle and configured to capture an image of an external environment of the vehicle, the camera module comprising:
   an optical assembly comprising two assembly reference surfaces for determining a position of an optical axis and captures an image of the external environment by forming an optical image incident along the optical axis from the external environment, the two assembly reference surfaces extending perpendicular to the optical axis and located at symmetrical positions on both left and right sides of the optical axis with one assembly reference surface on each side of the optical axis;
   a camera casing comprising a casing reference surface to be positioned with respect to the windshield on the outside of the camera casing; and
   an adhesive, which joins the optical assembly to the camera casing,
   wherein the adhesive joins the optical assembly to the camera casing in a state in which the optical assembly is separate from an inner wall surface of the camera casing,
   wherein an imaginary plane is defined by a direction in which the casing reference surface extends, and
   wherein the two assembly reference surfaces extend in a direction that is aligned with the imaginary plane defined by the casing reference surface.

2. The camera module according to claim 1, wherein the optical assembly and the camera casing are joined at sections via the adhesive, and the sections are located at symmetrical positions with respect to the optical axis.

3. The camera module according to claim 2, wherein the imaginary plane extends along the casing reference surface to be orthogonal to the optical axis.

4. The camera module according to claim 2, wherein
   the camera casing includes an exposure window, and
   the sections, at which the optical assembly and the camera casing are joined via the adhesive including an ultraviolet curing property, are exposed to the outside of the camera casing through the exposure window.

5. The camera module according to claim 2, wherein
   the optical assembly includes a lens barrel, which accommodates an imaging lens that forms the optical image, and a joint projection, which projects in a vicinity of the lens barrel with a space provided in between, and
   the sections, at which the joint projection and the camera casing are joined via the adhesive, are located on the opposite side of the joint projection from the space.

6. The camera module according to claim 2, wherein
   the camera casing includes an exposure window,
   the optical assembly includes a lens barrel, which accommodates an imaging lens that forms the optical image, and a joint projection, which projects in a vicinity of the lens barrel with a space provided in between, and
   the sections, at which the joint projection and the camera casing are joined via the adhesive including an ultraviolet curing property, are located on the opposite side of the joint projection from the space and are exposed to the outside of the camera casing through the exposure window.

7. The camera module according to claim 6, wherein the joint projection enters inside the exposure window.

8. The camera module according to claim 7, wherein
   the camera casing includes an exposure surface, which at least partially surrounds the exposure window and is inclined to separate further from the joint projection as the exposure surface extends toward the outside of the camera casing, and
   the joint projection is joined with the exposure surface via the adhesive.

9. The camera module according to claim 6, wherein the camera casing includes a lens window, which exposes the lens barrel to the outside of the camera casing.

10. The camera module according to claim 9, wherein
    the lens barrel enters inside the lens window, and
    the camera casing includes an inclined surface, which at least partially surrounds the lens window and is inclined to separate further from the lens barrel as the inclined surface extends toward the outside of the camera casing.

11. The camera module according to claim 9, wherein
the camera casing includes a communication window, which exposes the space to the outside of the camera casing, and
the exposure window communicates with the lens window through the communication window.

12. The camera module according to claim 11, wherein an opening of the communication window is narrower than an opening of the lens window.

13. The camera module according to claim 9, wherein the exposure window is separate from the lens window.

14. The camera module according to claim 5, wherein the optical assembly includes the joint projection and the two assembly reference surfaces on the same member.

15. The camera module according to claim 2, wherein the sections, at which the optical assembly and the camera casing are joined via the adhesive, include a first section, which extends along an optical axis direction in which the optical axis extends, and a second section, which extends along an intersecting direction with respect to the optical axis direction.

16. A method for manufacturing the camera module according to claim 4, comprising:
placing the adhesive between the optical assembly and the camera casing while the two assembly reference surfaces are aligned on the imaginary plane; and
completing curing of the adhesive by irradiating the adhesive that has been placed with ultraviolet light through the exposure window.

17. A method for manufacturing the camera module according to claim 4, comprising:
placing the adhesive between the optical assembly and the camera casing while the two assembly reference surfaces are aligned on the imaginary plane;
temporarily curing a part of the adhesive by irradiating the adhesive that has been placed with ultraviolet light through the exposure window; and
thermosetting a remaining part of the adhesive by heating the adhesive that has been temporarily cured.

18. The method for manufacturing the camera module according to claim 17, wherein
the adhesive located between the optical assembly and the camera casing includes a first section, which extends along an optical axis direction in which the optical axis extends, and at the first section, the part exposed to the outside of the camera casing through the exposure window is irradiated with ultraviolet light, so that the part is temporarily cured, and
the adhesive that has been temporarily cured includes a second section, which extends along an intersecting direction with respect to the optical axis direction, and at the second section, the remaining part located out of the exposure window and hidden inside the camera casing is heated, so that the remaining part is thermally cured.

19. The camera module according to claim 1, wherein
the optical assembly further comprises an imaging lens and an assembly adhesion surface, which has a surface accuracy lower than the surface accuracy of the two assembly reference surfaces; and
the camera casing further comprises a casing adhesion surface, which has a surface accuracy lower than the surface accuracy of the casing reference surface, and accommodates the optical assembly, wherein
as positions of the two assembly reference surfaces relative to the casing reference surface are adjusted so that an optical axis of the imaging lens is oriented to a predetermined region to be imaged, an adhesive is placed in a joint gap formed between the assembly adhesion surface and the casing adhesion surface.

20. The camera module according to claim 1, wherein
the optical assembly further comprises an imaging lens and an assembly adhesion surface, which has a surface accuracy lower than the surface accuracy of the two assembly reference surfaces;
the camera casing further comprises a casing adhesion surface, which has a surface accuracy lower than the surface accuracy of the casing reference surface, and accommodates the optical assembly; and
the adhesive is located in a joint gap between the assembly adhesion surface and the casing adhesion surface, wherein
a size of the joint gap is determined by a thickness of the adhesive, and an optical axis of the imaging lens is oriented toward a predetermined region to be imaged.

21. The camera module according to claim 1, wherein
the optical assembly further comprises an imaging lens and an assembly adhesion surface;
the camera casing further comprises a casing adhesion surface and accommodates the optical assembly; and
the adhesive is located in a joint gap between the assembly adhesion surface and the casing adhesion surface, wherein
a size of the joint gap is determined by a thickness of the adhesive, and an optical axis of the imaging lens is oriented toward a predetermined region to be imaged.

* * * * *